United States Patent
Kissane et al.

(10) Patent No.: US 12,265,913 B1
(45) Date of Patent: Apr. 1, 2025

(54) MACHINE LEARNING ARCHITECTURES WITH SUB-QUADRATIC ITERATOR MODULES

(71) Applicant: Crystal Computing Corp., Menlo Par, CA (US)

(72) Inventors: Cole Louis Kissane, Palo Alto, CA (US); Niveditha Subramanyam Iyer, Mountain View, CA (US)

(73) Assignee: Crystal Computing Corp., Menlo Park, CA (US)

( * ) Notice: Subject to any disclaimer, the term of this patent is extended or adjusted under 35 U.S.C. 154(b) by 0 days.

(21) Appl. No.: 18/781,938

(22) Filed: Jul. 23, 2024

Related U.S. Application Data

(60) Provisional application No. 63/674,721, filed on Jul. 23, 2024.

(51) Int. Cl.
*G06N 3/084* (2023.01)
*G06N 3/04* (2023.01)

(52) U.S. Cl.
CPC ............... *G06N 3/084* (2013.01); *G06N 3/04* (2013.01)

(58) Field of Classification Search
CPC ................................ G06N 3/084; G06N 3/04
See application file for complete search history.

(56) References Cited

U.S. PATENT DOCUMENTS

| | | | | |
|---|---|---|---|---|
| 2022/0019441 A1* | 1/2022 | Rosing | | G06N 3/084 |
| 2022/0083623 A1* | 3/2022 | Kalantzis | | G06N 3/08 |
| 2022/0310070 A1* | 9/2022 | Moritz | | G06N 3/08 |
| 2023/0376851 A1* | 11/2023 | Lee | | G06N 20/00 |
| 2024/0127041 A1* | 4/2024 | Smith | | G06N 3/044 |
| 2024/0185396 A1* | 6/2024 | Hatamizadeh | | G06T 5/60 |
| 2024/0202583 A1* | 6/2024 | Liu | | G06N 3/045 |

FOREIGN PATENT DOCUMENTS

| | | | | |
|---|---|---|---|---|
| EP | 4116870 A1 * | 1/2023 | ......... | G06F 18/2453 |
| WO | WO-2024077002 A2 * | 4/2024 | ........... | G06F 40/216 |

OTHER PUBLICATIONS

Kurach, Karol, Marcin Andrychowicz, and Ilya Sutskever. "Neural random-access machines." arXiv preprint arXiv:1511.06392 v3 (2016). (Year: 2016).*

(Continued)

*Primary Examiner* — Randall K. Baldwin
(74) *Attorney, Agent, or Firm* — Fish & Richardson P.C.

(57) ABSTRACT

Technology that includes receiving one or more inputs representative of an input sequence, and passing the one or more inputs sequentially through a plurality of modules of a machine learning model. Each module of the plurality of modules includes weights used for processing the one or more inputs to generate one or more outputs, and at least one of the plurality of modules is an iterator module that feeds back intermediate outputs of the iterator module as inputs to itself one or more times before passing an iterated output to a subsequent module of the plurality of modules. The iterator module has a sub-quadratic computational complexity in relation to a length of the input sequence. The technology also includes outputting the one or more outputs generated by a final module of the plurality of modules.

21 Claims, 15 Drawing Sheets

(56) References Cited

OTHER PUBLICATIONS

Nowak, Alex, David Folqué, and Joan Bruna. "Divide and conquer networks." International Conference on Learning Representations. 2018. (Year: 2018).*

Zheng, Lin, Chong Wang, and Lingpeng Kong. "Linear complexity randomized self-attention mechanism." International conference on machine learning. PMLR, 2022. (Year: 2022).*

Zhai, Yujia, et al. "Byte Transformer: A high-performance transformer boosted for variable-length inputs." 2023 IEEE International Parallel and Distributed Processing Symposium (IPDPS). IEEE, 2023. (Year: 2023).*

Keles, Feyza Duman, Pruthuvi Mahesakya Wijewardena, and Chinmay Hegde. "On the computational complexity of self-attention." International Conference on Algorithmic Learning Theory. PMLR, 2023. (Year: 2023).*

Iyer, Niveditha S., et al. "Cell morphological representations of genes enhance prediction of drug targets." bioRxiv (Jun. 2024): 2024-06. (Year: 2024).*

Fournier, Quentin, Gaétan Marceau Caron, and Daniel Aloise. "A practical survey on faster and lighter transformers." ACM Computing Surveys 55.14s (2023): 1-40. (Year: 2023).*

Giannou, Angeliki, et al. "Looped transformers as programmable computers." International Conference on Machine Learning. PMLR, 2023. (Year: 2023).*

Github.com [online], "Mxgmn/WaveFunctionCollapse," Jul. 21, 2022, retrieved on Oct. 18, 2024, retrieved from URL<https://github.com/mxgmn/WaveFunctionCollapse/>, 18 pages.

Li et al., "Diffusion-LM Improves Controllable Text Generation," CoRR, May 27, 2022, arXiv:2205.14217v1, 25 pages.

\* cited by examiner

MACHINE LEARNING ARCHITECTURES WITH SUB-QUADRATIC ITERATOR MODULES

TECHNICAL FIELD

The description generally relates to architectures for machine learning models (e.g., diffusion models, flow models, demasking models, encoder-decoder transformer models, decoder transformer models, etc.), including techniques for utilizing and training such models.

BACKGROUND

Machine learning is a branch of artificial intelligence that involves the use and development of computing devices and/or systems that are able to learn and adapt without following explicit instructions, by using algorithms and statistical models to analyze and draw inferences from patterns in data. There are various classes of machine learning techniques including regression techniques, clustering techniques, tree-based methods, and neural networks, which can be applied to the paradigms of supervised, unsupervised, and reinforcement learning. Within each of these classes, there can be various types of machine learning models (e.g., diffusion models, flow models, demasking models, encoder-decoder transformer models, decoder transformer models, etc.), which are characterized by distinct model architectures that can influence the performance of the machine learning models. In general, the "architecture" of a machine learning model refers to the structure and organization of the components and processes that are part of the machine learning model. In so-called "generative" applications, machine learning models can be used to generate text, image, and other content based on the data they were trained on.

SUMMARY

This document describes architectures for machine learning models that include iterator modules with sub-quadratic computational/time complexity (e.g., less than $O(n^2)$ time complexity) during training and/or for producing inferences. As used herein, the term "iterator modules" refers to one or more architecture components or "primitives" configured to receive inputs and generate outputs, and are further configured to feed back the output (e.g., "intermediate outputs") as inputs to itself one or more times before passing on an ultimate output (e.g., an "iterated output") to a subsequent module of the machine learning model. These sub-quadratic iterator modules can be implemented in various types of machine learning models including (but not limited to) diffusion models, flow models, demasking models, encoder-decoder transformer models, and decoder transformer models. This document further describes methods of utilizing and training the machine learning models described herein.

In one aspect, this document features a method that includes receiving one or more inputs representative of an input sequence, and passing the one or more inputs sequentially through a plurality of modules of a machine learning model. Each module of the plurality of modules includes weights used for processing the one or more inputs to generate one or more outputs, and at least one of the plurality of modules is an iterator module that feeds back intermediate outputs of the iterator module as inputs to itself one or more times before passing an iterated output to a subsequent module of the plurality of modules. The iterator module has a sub-quadratic computational complexity in relation to a length of the input sequence. The method also includes outputting the one or more outputs generated by a final module of the plurality of modules.

In another aspect, the document features a machine learning model encoded on one or more non-transitory machine-readable storage media. The machine learning model is configured to receive one or more inputs representative of an input sequence, and pass the one or more inputs sequentially through a plurality of modules of the machine learning model. Each module of the plurality of modules includes weights used for processing the one or more inputs to generate one or more outputs, and at least one of the plurality of modules is an iterator module that feeds back intermediate outputs of the iterator module as inputs to itself one or more times before passing an iterated output to a subsequent module of the plurality of modules. The iterator module has a sub-quadratic computational complexity in relation to a length of the input sequence. The machine-learning module is also configured to output the one or more outputs generated by a final module of the plurality of modules.

In another aspect, this document describes a system that includes memory and one or more processing devices configured to execute machine-readable instructions stored in the memory. The instructions, when executed by the one or more processing devices, are configured to cause the one or more processing devices to perform operations that include receiving one or more inputs representative of an input sequence, and passing the one or more inputs sequentially through a plurality of modules of a machine learning model. Each module of the plurality of modules includes weights used for processing the one or more inputs to generate one or more outputs, and at least one of the plurality of modules is an iterator module that feeds back intermediate outputs of the iterator module as inputs to itself one or more times before passing an iterated output to a subsequent module of the plurality of modules. The iterator module has a sub-quadratic computational complexity in relation to a length of the input sequence. The operations also include outputting the one or more outputs generated by a final module of the plurality of modules.

Each of the above aspects can include one or more of the following features.

The machine learning model can include a diffusion model, a flow model, a demasking model, an encoder-decoder transformer model, or a decoder transformer model. The iterator module can include one or more primitives that enable transfer of information from one portion of the input sequence to another portion of the input sequence. The one or more primitives of the iterator module can include at least one of a sliding window attention primitive, a sparse attention primitive, a self-attention primitive, a state-space information moving primitive, or a non-pointwise information transfer primitive. The one or more primitives of the iterator module can be both forward-looking and backward-looking. The number of times that the iterator module feeds back the intermediate outputs of the iterator module as inputs to itself can be a pre-determined number. The number of times that the iterator module feeds back the intermediate outputs of the iterator module as inputs to itself can be based on at least one of (i) a size of the input sequence or (ii) a target sequence length of the one or more outputs generated by the final module.

Passing the one or more inputs sequentially through the plurality of modules of the machine learning model can include determining whether each intermediate output of the iterator module satisfies a condition, and in response to determining that the condition is satisfied by a specific intermediate output, passing the specific intermediate output to the subsequent module of the plurality of modules as the iterated output. Determining whether each intermediate output of the iterator module satisfies the condition can include determining whether each intermediate output is substantially similar to one or more previously generated intermediate outputs. Determining whether each intermediate output of the iterator module satisfies the condition can include utilizing metrics to determine whether or not each intermediate output is likely to be substantially similar to an intermediate output generated after a number of additional iterations of the iterator module. Determining whether each intermediate output of the iterator module satisfies the condition comprises utilizing a classifier to determine whether or not each intermediate output is likely to result in the one or more outputs generated by the final module satisfying a user-defined control. The user-defined control can include a target sequence length of the one or more outputs generated by the final module, a target semantic characteristic of the one or more outputs generated by the final module, a target metric of data structure cohesion of the one or more outputs generated by the final module, one or more form fields included among the one or more outputs generated by the final module, a target sentiment characteristic of the one or more outputs generated by the final module, an inclusion of specific tokens among the one or more outputs generated by the final module, or a target metric indicative of bias.

The iterator module can be configured to feed back the intermediate outputs of the iterator module and one or more previously generated intermediate outputs of the iterator module as inputs to itself. The iterator module can be configured to change a representation size of the intermediate outputs of the iterator module before feeding back the intermediate output as inputs to itself. The output sequence generated by at least one of the plurality of modules of the machine learning model is partially fixed, and the method can include altering or adding to an unfixed portion of the output sequence. The one or more outputs generated by the final module of the plurality of modules can be partially fixed, and the method can include altering or adding to the unfixed portions of the one or more outputs generated by the final module without reprocessing all of the one or more inputs using the plurality of modules.

A portion of the one or more inputs can be updated to include one or modified inputs, and the one or more modified inputs can be sequentially passed through a plurality of modules of the machine learning model. Only a portion of the one or more inputs corresponding to the one or more modified inputs can be processed using the plurality of modules. One or more modified outputs generated by the final module of the plurality of modules can be provided as the final output.

An explanation for a behavior of the machine learning model, can be determined, the determining including comparing the one or more outputs generated by the final module with the one or more modified outputs generated by the final module, and comparing a first set of activations of the machine learning model used to produce the one or more outputs with a second set of activations of the machine learning model used to produce the one or more modified outputs. The machine learning model can be trained by receiving one or more training inputs representative of a training sequence, passing the one or more training inputs sequentially through the plurality of modules of the machine learning model, determining a loss value based on the outputs generated by at least a portion of the plurality of modules, and modifying the weights of each of the plurality of modules based on the determined loss value.

Various implementations of the technology described herein may provide one or more of the following advantages.

First, the techniques described herein can enable the efficient transfer of information from one portion of a sequence being processed (e.g., an input sequence) to another portion of the sequence while limiting the loss of important contextual information in the sequence. This can, in turn, improve the quality of outputs (e.g., inferences) generated by the machine learning model. A disadvantage of many existing machine learning primitives that perform an analogous transfer of information (e.g., self-attention primitives) is that they are either (i) quadratic in time complexity, requiring every token in a sequence to have an attention weight for every other token in the sequence (which can be prohibitively time-consuming and memory intensive for certain applications), or (ii) they are limited in amount of information transfer (which can limit the performance of models built using these primitives for valuable use cases including large language models (LLMs), chatbots, reasoning, and genomics. For example, while alternative sub-quadratic primitives have been developed including sliding window attention techniques and sparse attention, these techniques are limited in the amount and quality of information they are able to transfer from one portion of the sequence to another. To overcome these challenges, this document describes implementing sub-quadratic primitives coupled with iterative application (e.g., as part of an iterator or diffusion module). Using this approach, the transfer of information between different portions of a sequence can be done efficiently while maintaining as much fidelity of contextual information as required for a particular application. The sub-quadratic primitives used can also be both forward-looking and backward-looking, so that they are not limited to transferring information from only certain portions of the sequence. In addition, this document introduces and describes a compatible paradigm of using "worker embeddings," which results in amortized compute loads that do not scale with sequence length for small sequence length, by dedicating compute to a fixed number of positions. Coupling this approach with iterative models, allows for the iteration to maintain high quality global behaviors.

Second, the techniques described herein can be used to tune the quality of machine learning outputs (and the time to generate them) for various applications. For example, in applications where lower fidelity outputs or less information transfer within the input sequence is required, the iterator module of the machine learning architecture can run through fewer iterations before passing the processed information through the remainder of the machine learning model. Alternatively, in applications where higher fidelity outputs or more information transfer within the input sequence is required, the iterator module of the machine learning architecture can run through more iterations before passing the processed information through the remainder of the machine learning model. In some implementations, the number of iterations can be a pre-determined (e.g., user-defined) number based on a specific application or setting. In other implementations, the number of iterations can be automatically determined, for example, by determining that the successive outputs of the iterator module are adequately similar to one another or by predicting that the outputs of the iterator module will not change by more than a threshold amount after a certain number of additional iterations.

Third, the techniques described herein can enable greater user control of the outputs generated by a machine learning model. For example, a user may desire to control characteristics of the outputs such as a semantic characteristic of the output (e.g., a tone of the output text generated by the machine learning model, an output sequence length, etc.). By implementing a classifier that evaluates whether the intermediate outputs of the iterator module are likely to result in one or more model outputs that satisfy the user-defined control, an informed determination can be made as to whether or not the iterator module should run through additional iterations. Compared to existing machine learning model architectures, this can increase the likelihood that the outputs of the machine learning model satisfy any user-defined controls. In some implementations, user control can also be achieved using one or more control modules implemented in the machine learning model to provide customizability and/or by implementing a separate machine learning model that samples output sequences generated by one or more modules of the primary machine learning model and is trained to make changes to the sequence in the latent space to satisfy a user-defined control.

Fourth, the techniques described herein have the advantage of enabling the flexibility of implementing variable space usage. For example, if the computing resources for a particular task allow for it, the iterator module can feed back not only the most recent intermediate output from the iterator module to itself, but also one or more previously generated intermediate outputs to increase the quality of outputs generated by the machine learning model. In some implementations, the iterator module can also change the representation size of the intermediate outputs (e.g., either making them smaller or larger) to meet the requirements of a particular task as well as the computational resources available in a particular setting.

Fifth, the techniques described herein have the advantage of enabling infilling applications, in which portions of the outputs generated by the machine learning model (or by modules of the machine learning model) are treated as fixed, while other portions of the outputs are allowed to be re-generated or "de-noised." In some implementations, this can yield the advantage of producing new outputs without requiring the full computational cost of generating the outputs from scratch. Similarly, modified input sequences (e.g., slightly edited text prompts) can be used to generate modified outputs without requiring the full computational cost of generating the outputs from scratch.

Sixth, the techniques described herein can improve the explainability of a machine learning model. For example, by comparing various modified outputs generated by the machine learning model (e.g., in response to different input sequences) as well as the activations of the machine learning model used to produce those outputs, the behavior of the machine learning model can be studied to explain why the model produces the outputs that it does.

Seventh, the techniques described herein can improve the training of machine learning models that include iterator modules because, unlike traditional training techniques such as those used in iterative model architectures such as diffusion models, the model can be trained with an awareness that it will be used, at inference, in an iterative fashion. Thus, rather than simply learning how to optimize a single operation (e.g., a denoising operation) that is iteratively performed, the machine learning model is able to learn a higher-level iterative process for transforming an input sequence to a desired output. This can enable intermittent computations states to be learned like "scratchwork," analogous to an illustration that is created by a sequential process of outlining basic shapes, then adding in additional details, removing unnecessary lines, shading the illustration, etc. with repeated passes by an artist.

Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

Figure 1:
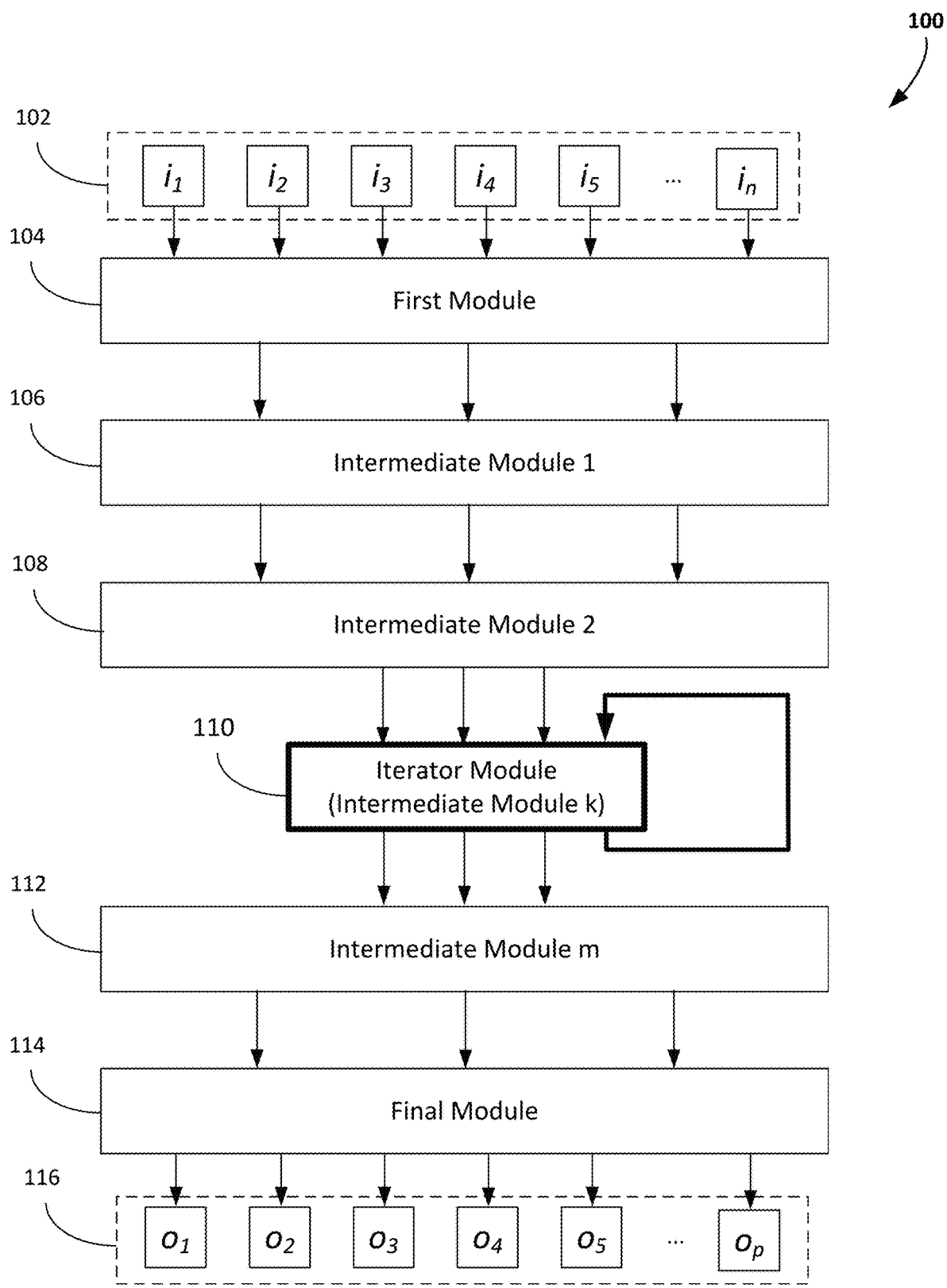
FIG. 1 is an architectural diagram of a machine learning model that includes an iterator module.

FIG. 1 is an architectural diagram of a machine learning model 100 that includes an iterator module 110. As described above, the term "iterator module" refers to one or more architecture components or "primitives" configured to receive inputs and generate outputs, and are further configured to feed back the output (e.g., "intermediate outputs") as inputs to itself one or more times before passing on an ultimate output (e.g., an "iterated output") to a subsequent module of the machine learning model.

In the example shown, the machine learning model 100 is an artificial neural network. Artificial neural networks can be classified into various types of models including (but not limited to) diffusion models, flow models, demasking models, encoder-decoder transformer models, and decoder transformer models-all of which are within the scope of the description provided herein. The machine learning model 100 includes a first module 104, which receives an input sequence 102 composed of various tokens (i to in) and provides outputs to a first module 104. The first module 104 processes the outputs (e.g., an output sequence) received from the first module 104 to generate other outputs (e.g., another output sequence) that are provided to intermediate module 1 (106), and this process proceeds through the other intermediate modules of the model 100 (e.g., through intermediate module 2 (108), intermediate module k (110), intermediate module m (112), etc.). The model 100 further includes a final module 114 that receives the outputs of the last intermediate module (in this example, intermediate module m (112)), processes these values, and generates an output sequence 116 comprising output tokens $o_1$ to $o_p$.

In general, the model 100 can include any number of intermediate modules (e.g., zero modules, one module, two modules, ten modules, fifty modules, etc.). Each module can be a single layer of the artificial neural network or a more complex module such as multilayer perceptron module or a transformer module. The various modules 104, 106, 108, 110, 112, 114 can be the same or can be from different from one another. At each module 104, 106, 108, 110, 112, 114, one or more weights may be adjusted during a training process to minimize or reduce a loss metric determined for a particular task. For example, referring briefly to FIG. 10, a training process for the machine learning model 100 is depicted, in which the output sequence 116 is fed to a loss function 1002 to calculate a loss metric relative to a target output sequence or a training example. The loss metric calculated by the loss function 1002 can be used to adjust the weights of one or more of the modules 104, 106, 108, 110, 112, 114 via backpropagation.

In the example shown in FIG. 1, intermediate module k (110) is an iterator module that initially receive inputs from intermediate module 2 (108), but then feeds back its own outputs (referred to herein as "intermediate outputs") to itself iteratively before ultimately passing its final output (referred to herein as the "iterated output") to the intermediate module m (112). In other implementations, any of the modules of the machine learning model 100 (e.g., modules 104, 106, 108, 110, 112, 114) can be an iterator module, and in some implementations, the machine learning model 100 can include multiple iterator modules.

One advantage of the machine learning model 100 with iterator module 110 is that it can allow for the efficient transfer of information from one portion of a sequence being processed (e.g., the input sequence 102) to another portion of the sequence while limiting the loss of important contextual information in the sequence. For example, in the context of text processing/generation, the input sequence 102 can represent a sentence that serves as a prompt. To generate a useful output that is responsive to the prompt, it can be important to consider information from various words in the sentence, which may not be positioned near to one another. In such circumstances, it can be critical to transfer the information from important words in one part of the sentence to important words in other parts of the sentence. However, many previously existing approaches for conducting this transfer of information are prohibitively computationally expensive, limiting the length of sequences that can be processed and/or increasing the time needed for processing.

Figure 2A:
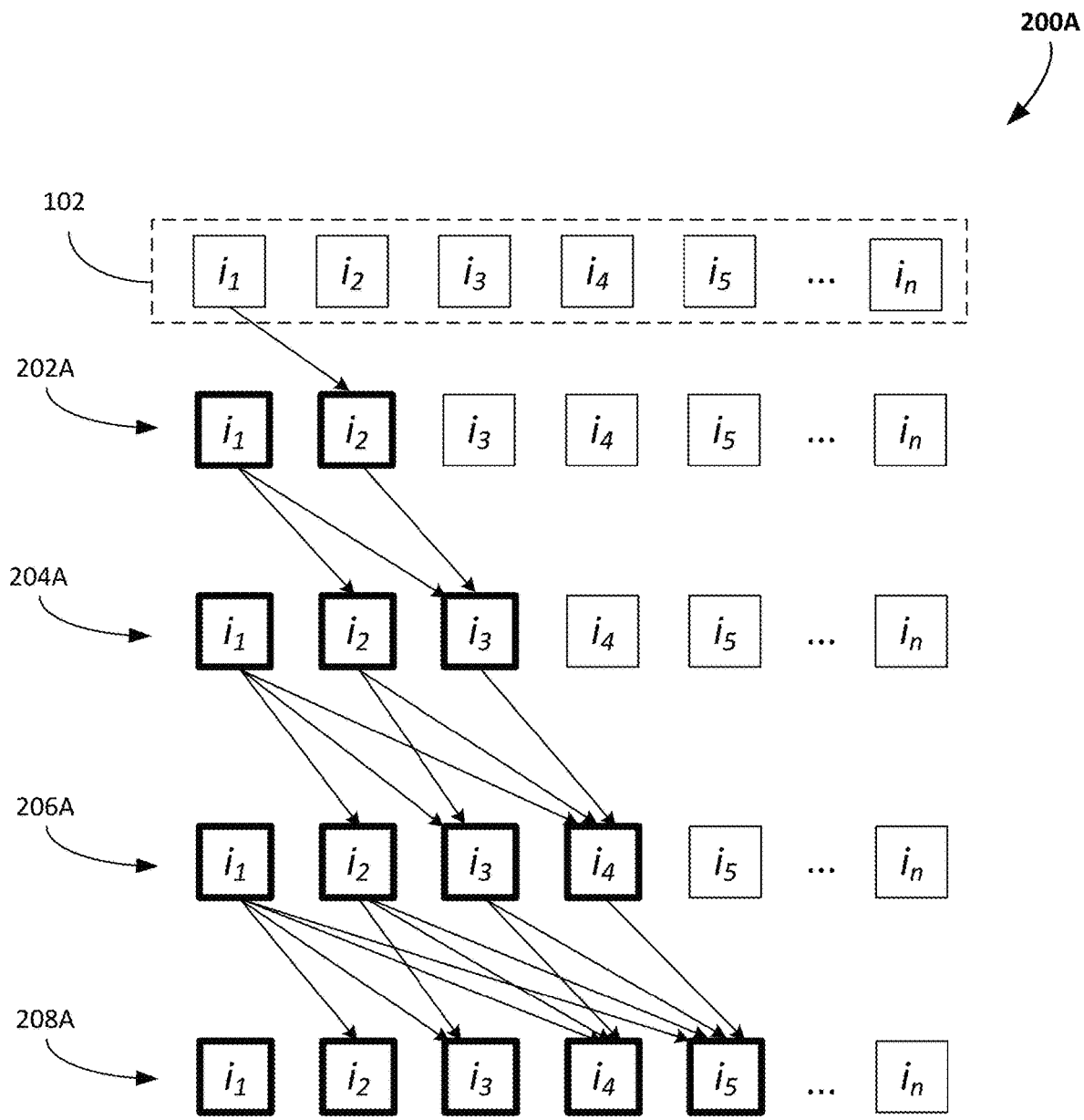
FIG. 2A-2D are diagrams illustrating various machine learning primitives for transferring information from one portion of a sequence to another.

Referring to FIG. 2A, an example machine learning primitive for transferring information from one portion of the input sequence 102 to another portion of the sequence 102 is shown, with each consecutive row (202A, 204A, 206A, 208A) representing the subsequent processing of an additional token within the input sequence 102. The overall process 200A is a backward-looking or "causal" self-attention process in which each token is processed based on the information of all tokens that come before it in the sequence 102. For example, as shown in row 202A, token $i_2$ is processed with access to the information from token $i_1$. As shown in row 204A, token $i_3$ is processed with access to the information from tokens $i_1$ and $i_2$. As shown in row 206A, token $i_4$ is processed with access to the information from tokens $i_1$ through $i_3$. And as shown in row 208A, token $i_5$ is processed with access to the information from tokens $i_1$ through $i_4$. Using the self-attention machine learning primitive shown in FIG. 2A, as the sequence 102 grows in length, the computational cost of processing the sequence grows quadratically ($O(n^2)$). However, as explained above, this quadratic computational/time complexity can be a prohibitive limitation for real-world machine learning applications limiting the length of sequences that can be processed by computing devices and/or increasing the time needed for processing.

Figure 2B:
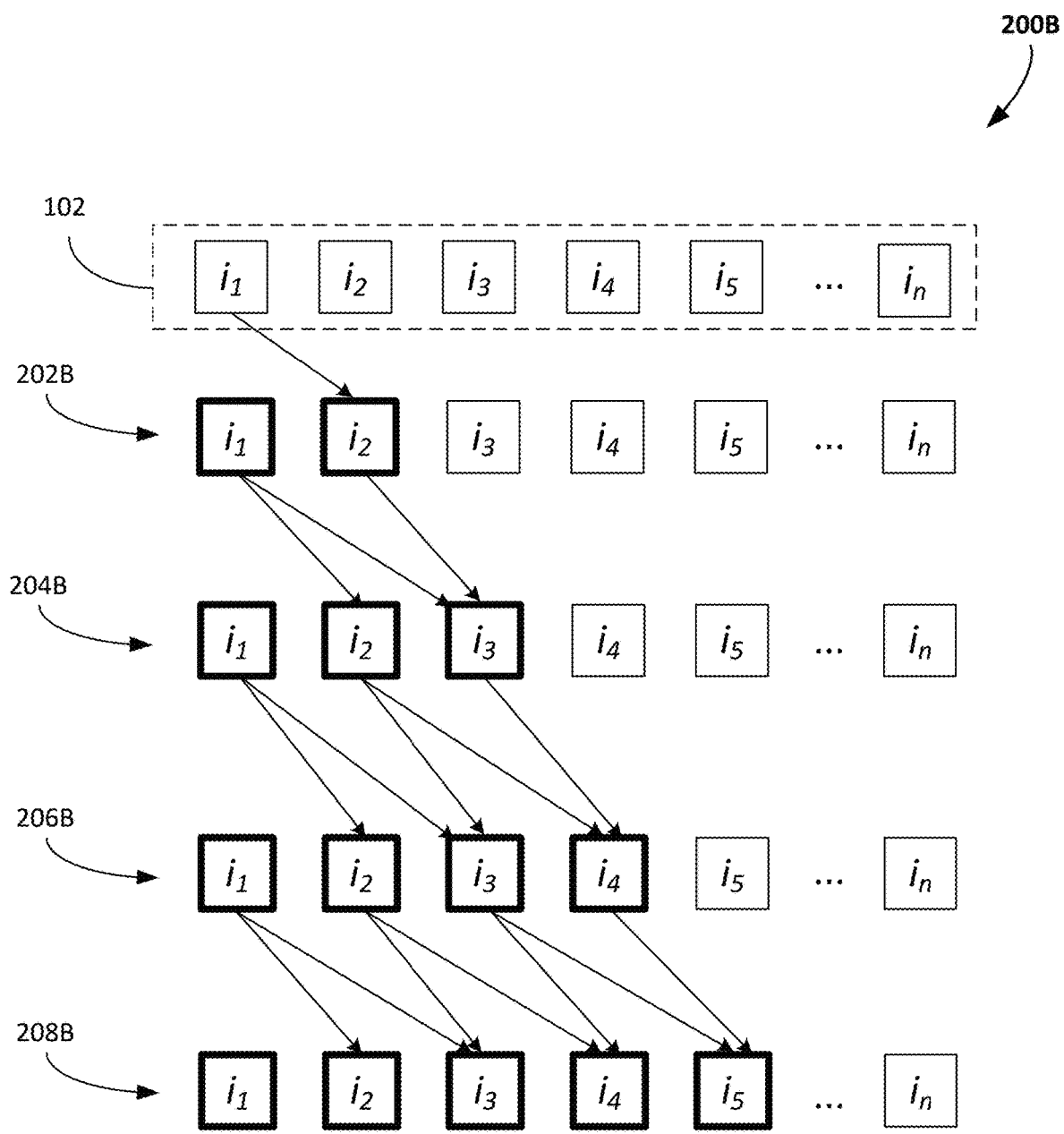

To address the issue of computational complexity, some have attempted to use sub-quadratic attention mechanisms such as the example machine learning primitive shown in FIG. 2B. The process 200B shown in this example corresponds to a sliding window attention mechanism in which each token is processed with access to information from a fixed number (n=2) of immediately preceding tokens of the sequence 102. As shown in row 202B, the token $i_2$ is processed with access to the information from token $i_1$. As shown in row 204B, token $i_3$ is processed with access to the information from tokens $i_1$ and $i_2$. As shown in row 206B, token $i_4$ is processed with access to the information from tokens $i_2$ and $i_3$. And as shown in row 208B, token $i_5$ is processed with access to the information from tokens $i_3$ and $i_4$.

The primitive shown in FIG. 2B is sub-quadratic in time complexity, resulting in faster processing of the sequence 102 relative to the primitive shown in FIG. 2A. However, information is not transferred as efficiently between portions of the sequence 102. For example, token is only has access to the information from token $i_1$ indirectly through token $i_3$, which can result in the dilution of such information, especially as the sequence 102 grows in length and the tokens become more distant from one another. Given this challenge, it is desirable to develop sub-quadratic primitives and machine learning model architectures that can be utilized to more efficiently transfer information from one portion of a sequence to another.

Figure 2C:
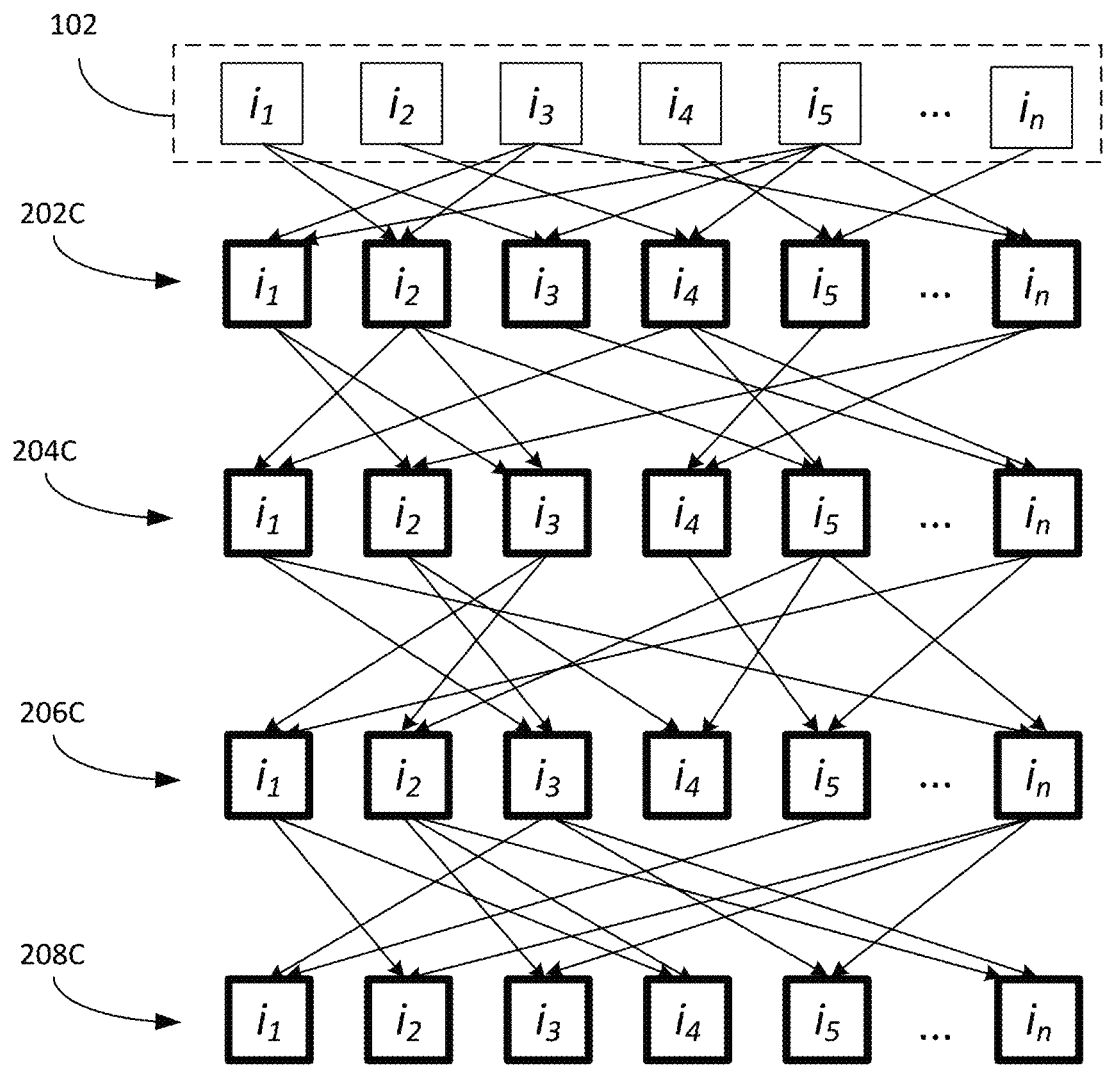

Referring now to FIG. 2C, it is shown how a sub-quadratic primitive can be used as (or within) the iterator module 110 of the machine learning model 100 (shown in FIG. 1) to more efficiently transfer information from one portion of the sequence 102 to another portion of the sequence 102. In the sub-quadratic primitive shown, each token of the sequence 102 is processed using information from a fixed number of other tokens in the sequence. (Here, that fixed number is two.)

In FIG. 2C, each row represents an iteration of the sub-quadratic primitive as part of the iterator module 110 shown in FIG. 1. That is, row 202C represents a first iteration of the iterator module 110, row 204C represents a second iteration of the iterator module 110, row 206C represents a third iteration of the iterator module 110, and row 208C represents a fourth iteration of the iterator module 110. With each iteration of the iterator module 110, the sub-quadratic primitive illustrated in FIG. 2C enables each token in the sequence 102 to directly access information from the two most relevant other tokens in the sequence. This can be preferable to the sub-quadratic primitive described with respect to FIG. 2B where information from distant tokens could only be accessed indirectly and may be diluted. Moreover, unlike the machine learning primitive described in relation to FIG. 2A, the iterative use of the primitive shown in FIG. 2C does not scale quadratically in complexity with the length of the input sequence 102. Instead, direct information transfer from various portions of the sequence 102 can be achieved simply by running additional iterations of the iterator module 110 to access different portions of the sequence 102.

While the sub-quadratic primitive is illustrated in FIG. 2C as being both forward and backward looking, in other implementations, it can be strictly backward looking or strictly forward looking depending on the application of the model 100. Furthermore, while FIG. 2C illustrates an example of a sub-quadratic primitive that can work well with the iterator module 110 shown in FIG. 1, it is envisioned that many other sub-quadratic primitives (e.g., a sliding window attention primitive, a sparse attention primitive, a self-attention primitive, a state-space information moving primitive, or a non-pointwise information transfer primitive) can be substituted into the iterator module 110 to achieve similar advantages.

Figure 2D:
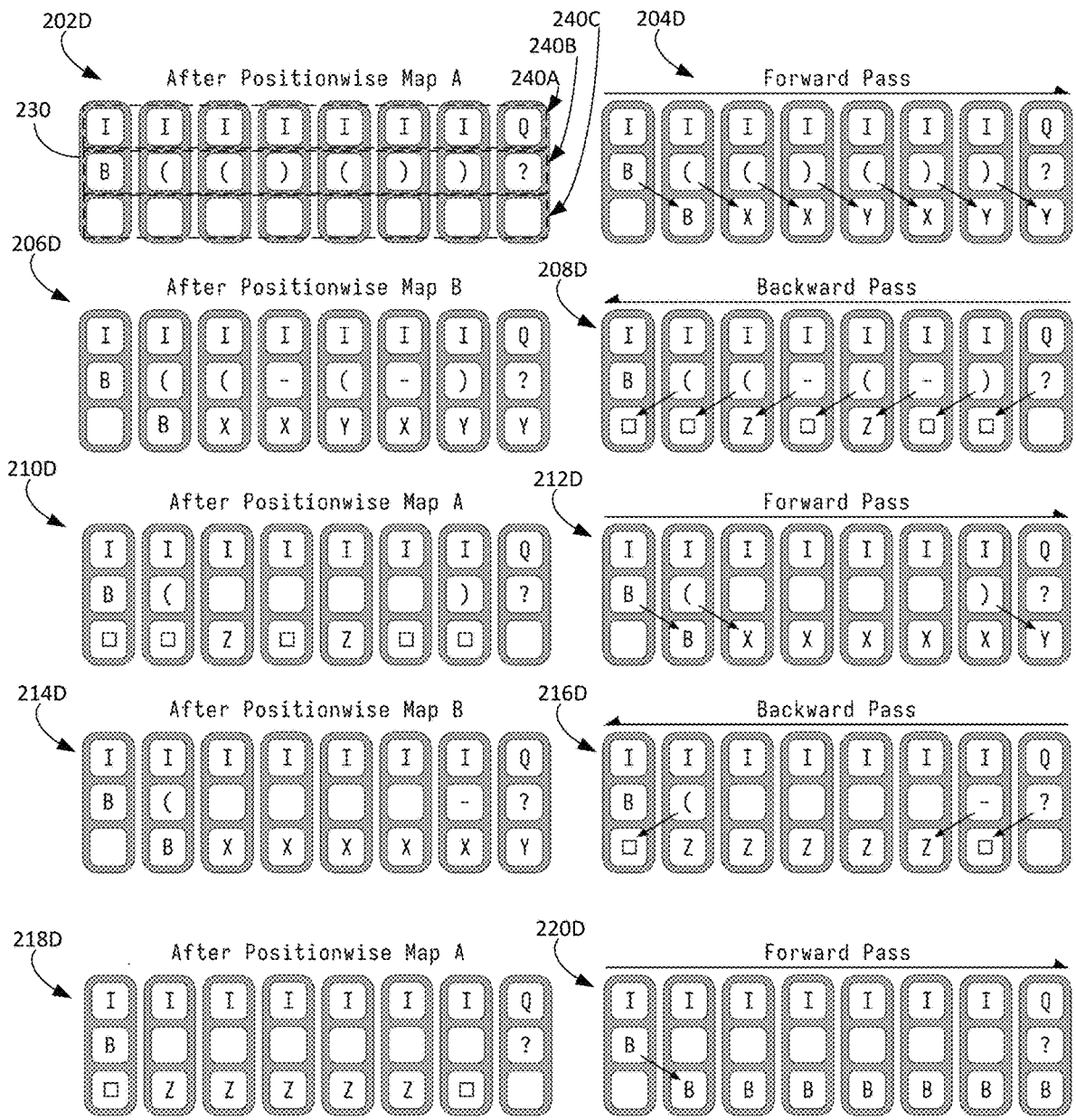

Referring now to FIG. 2D, it is shown how a state-space primitive can be used to transfer information from one portion of a sequence to another portion of the sequence. As illustrated by FIG. 2D, bi-directional information flow within sequence primitives can improve utilization of state-space communication in iterative models such as the machine learning model 100. This stems from the fact that the model is working with a limited number of bits. Sequence positions can communicate through the state space. Once a certain sequence position has communicated information relevant to other positions (and knows that this information has been integrated), they no longer need to populate communication channels with redundant bits that are no longer necessary for others to receive. This can be likened to Internet packet protocols where packets are re-sent unless they are indicated as having already been received by the receiver. However, for the receiver to inform the sender of the same, it must also be sending information (here, a message) back to the sender.

In FIG. 2D, each vertically oriented bounding box (e.g., bounding box 230) represents a token embedding with multiple channels (e.g., channel 1 (240A), channel 2 (240B), channel 3 (240C)) that contain information. In this simple example, channel 1 (240A) distinguishes input tokens (I) and query tokens (Q), channel 2 (240B) contains a sequence of parentheses, and channel 3 (240C) acts as an information passer. However, in other implementations, a different number of channels can be used depending on the task to be performed.

Multiple token embeddings can be grouped together in a sequence to represent a sequence primitive (e.g., state-space primitives 202D, 204D, 206D, 208D, 210D, 212D, 214D, 216D, 218D, 220D). In FIG. 2D, each primitive (202D, 204D, 206D, 208D, 210D, 212D, 214D, 216D, 218D, 220D) represents a different state of a state-space primitive as various information passing "rules" are implemented to complete a task. Here, the task to be performed is to fill in the parenthesis for a given query token with an open parenthesis "(" or a close parenthesis ")" in a way that keeps the sequence of parentheses in channel 2 (240B) balanced. For example, here, the "?" in channel 2 (240B) of primitive 202A should be replaced with an open parenthesis "(" since the parentheses coming before it in the sequence are already balanced, leaving no open parentheses left to pair with a close parenthesis. Using this toy example, it is illustrated how bi-directional information flow (e.g., forward and backward passes through the sequence) can correctly inform the replacement of the "?" in the query token while limiting the passing of redundant information.

To perform the parentheses balancing task, a set of information passing rules can be defined. First, a "Positionwise Map A" rule can be defined that (i) clears the information in channel 2 (240B) of a token if channel 2 (240B) includes a "(" and if channel 3 (240C) includes a "Z", or (ii) clears the information in channel 2 (240B) of a token if channel 2 (240B) includes a "-". Second, a "Positionwise Map B" rule can be defined that inserts a "-" in channel 2 (240B) of a token if channel 2 (240B) includes a ")" and if channel 3 (240C) includes a "X". Third, a "Forward Pass" rule can be defined that passes information forward in a sequence by (i) inserting a "B" in channel 3 (240C) of a token if the immediately preceding token in the sequence includes a "B" in channel 2 (240B), (ii) inserting a "X" in channel 3 (240C) of a token if the immediately preceding token in the sequence includes a "(" in channel 2 (240B), and (iii) inserting a "Y" in channel 3 (240C) of a token if the immediately preceding token in the sequence includes a ")" in channel 2 (240B). On the other hand, if the immediately preceding token includes no information in channel 2 (240B), then the information from channel 3 (240C) of the immediately preceding token is passed through to channel 3 (240C) of the token without change. Finally, a "Backward Pass" rule can be defined that passes information backward in the sequence by (i) passing through the content of channel 3 (240C) of the immediately subsequent token to channel 3 (240C) of the current token if channel 2 (240B) of the immediately subsequent token is empty, (ii) inserting a "Z" in channel 3 (240C) of the token if the immediately subsequent token in the sequence includes a "-" in channel 2 (240B), and (iii) otherwise inserting a square "□" in channel 3 (240C) of the token.

The information passing rules defined above can be iteratively performed in a sequence of "Positionwise Map A" followed by a "Forward Pass" followed by a "Positionwise Map B" followed by a "Backward Pass", as shown in FIG. 2D. Primitive 202D represents a first state of a state-space sequence primitive after performing the "Positionwise Map A" rule. Primitive 204D represents an updated state of the state-space sequence primitive after subsequently performing the "Forward Pass" rule. Primitive 206D represents an updated state of the state-space sequence primitive after subsequently performing the "Positionwise Map B" rule. Primitive 208D represents an updated state of the state-space sequence primitive after subsequently performing the "Backward Pass" rule. Primitive 210D represents an updated state of the state-space sequence primitive after subsequently performing the "Positionwise Map A" rule for a second time. Primitive 212D represents an updated state of the state-space sequence primitive after subsequently performing the "Forward Pass" rule for a second time. Primitive 214D represents an updated state of the state-space sequence primitive after subsequently performing the "Positionwise Map B" rule for a second time. Primitive 216D represents an updated state of the state-space sequence primitive after subsequently performing the "Backward Pass" rule for a second time. Primitive 218D represents an updated state of the state-space sequence primitive after subsequently performing the "Positionwise Map A" rule for a third time. And primitive 220D represents an updated state of the state-space sequence primitive after subsequently performing the "Forward Pass" rule for a third time.

At the end of this process, a "B" ends up in channel 3 (240C) of the query token in state-space primitive 220D, suggesting that the sequence of parentheses in the primitive 202D was balanced. Therefore, the "?" in channel 2 (240B) of the query token in state-space primitive 220D will be replaced with an open parenthesis "(" (e.g., the desired result described above). However, in other scenarios, if an "X" ends up in channel 3 (240C) of the query token in state-space primitive 220D, this would suggest that the sequence of parentheses in the initial primitive 202D was not balanced, and the "?" could be replaced with either an open parenthesis "(" or a close parenthesis ")". As shown through this example, by iteratively using bi-directional passes for information transfer, state-space sequence primitives can be effectively utilized for efficient information passing from one portion of a sequence to another.

Yet another technique for managing the computational demands of machine learning model 100 is by using "worker embeddings" that allow for the accumulation of information from various tokens in an input sequence while shifting the majority of computation into a fixed size latent compared to a whole sequence that varies with input length. This will allow for amortized linear runtime in sequence length. These worker embeddings can be implemented as part of any (or all) of the modules of the machine learning model 100 including modules 104, 106, 108, 110, 112, 114.

For example, consider the implementation of worker embeddings within the iterator module 110. The sequence/embedding received as input to the iterator module 110 may be expressed as a data structure $x_i$. However, using worker embeddings $w_e$ (e.g., trainable weights within the model 100), an attention operation can be performed using the worker embeddings $w_e$ as queries and using $x_i$ as the keys and values to produce a new worker embedding $w_x$=Attention ($w_e$, $x_i$). Compared to the size of $x_i$ which grows with the length of the initial input sequence 102, the worker embedding $w_x$ can be of fixed size regardless of the initial input sequence 102 and may be smaller than the dimensions of $x_i$. Thus, this worker embedding (e.g., a latent representation) can have advantages for use in processing by more computationally expensive portions of the machine learning model 100 (e.g., iterative feedforward network layers within the iterator module 110) compared to processing $x_i$ directly.

After these computationally expensive operations are performed, the resulting output $x_2$ can be restored to a latent representation with a size that scales with the length of the input sequence 102. For example, this can be achieved by taking the output ($w_y$) of the computationally expensive portion of the model 100 and using this as the keys and values of another attention operation in which $x_i$ is used as the query, and then summing the result with $x_i$ to obtain a new latent representation $x_{next}$. Expressed mathematically, $x_{next}$=$x_i$+Attention ($x_i$, $w_y$). This resulting representation $x_2$ can then be used for further processing by the machine learning model 100, including by less computationally expensive portions of the model. In this manner, amortized linear runtime in sequence length can be achieved, thereby improving upon the operation of computing devices implementing the machine learning model 100 with limited computational resources.

Figure 3:
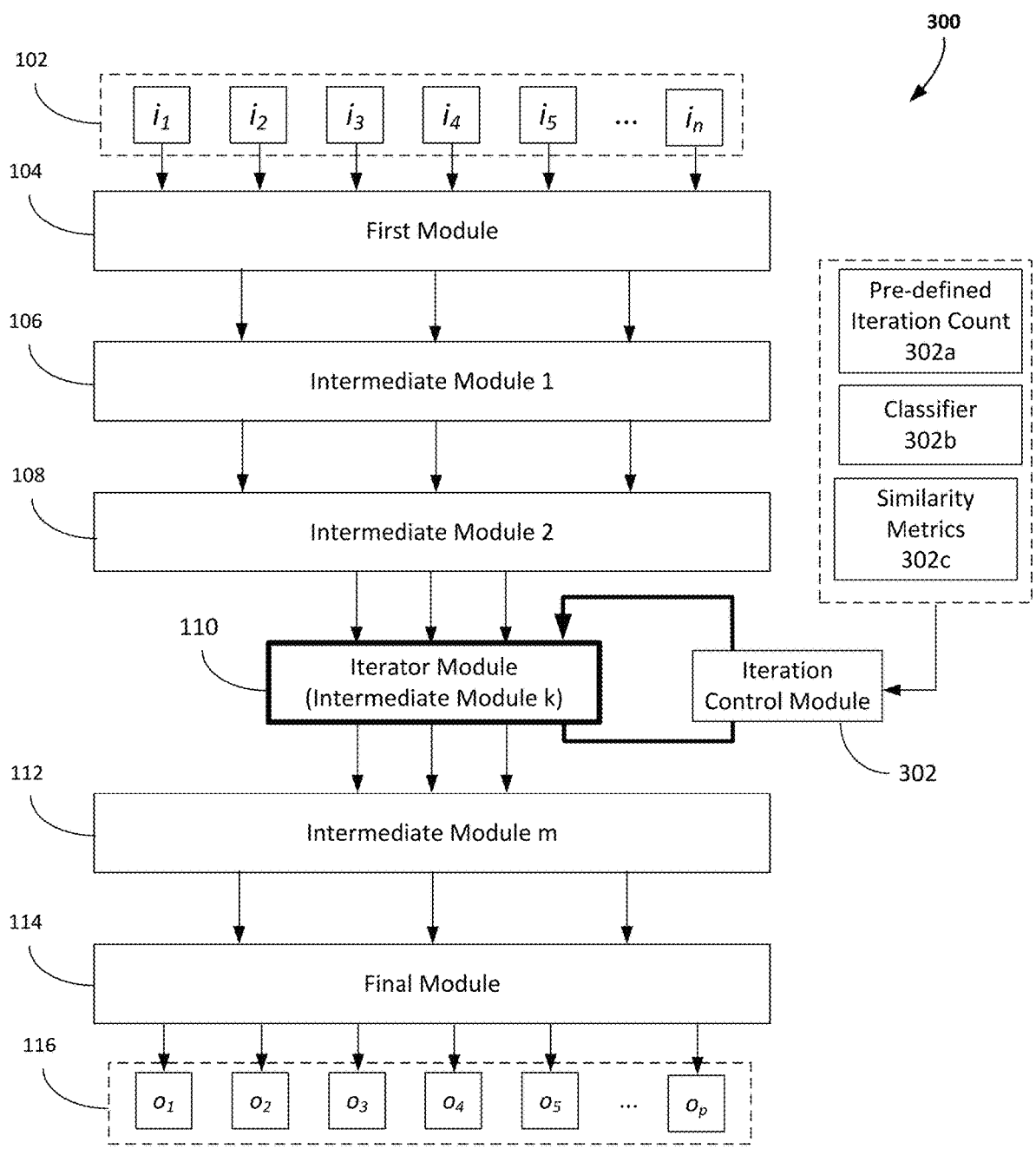
FIG. 3 is a diagram illustrating techniques for controlling a number of iterations of an iterator module.

Referring now to FIG. 3, the architecture of a machine learning model 300 is shown that enables techniques for controlling the number of iterations performed by the iterator module 110. The machine learning model 300 has many similarities to the machine learning model 100 shown in FIG. 1, and consequently, like components have been labeled with like reference numerals. However, compared to the machine learning model 100, the machine learning model 300 additionally includes an iteration control module 302 for controlling the number of iterations performed by the iterator module 110. As shown, the iteration control module can control the number of iterations performed based on a pre-defined iteration count (302a), a classifier (302b), or similarity metrics (302c).

In general, controlling the number of iterations performed by the iterator module 110 can be beneficial because it can limit the amount of computation needed to generate outputs based on the specific needs of a particular application context and/or the limitations (e.g., hardware limitations) of a particular computing device or system. For example, relatively few iterations of the iterator module 110 may be desirable in settings with limited computational resources or hardware capabilities, or in applications where less control is required over the outputs generated by the machine learning model 300. However, a greater number of iterations of the iterator module 110 may be desirable in less constrained settings, or in applications where substantial control is required over the outputs generated by the machine learning model 300.

In some implementations, a pre-defined iteration count 302a can be defined by a user or defined automatically, based on, e.g., (i) the computing resources available or hardware limitations of the user's computing device or system or (ii) a desired fidelity/quality of the outputs generated by the machine learning model 300.

In some implementations, the iteration control module 302 can determine the number of iterations to be performed by the iterator module 110 based on a classifier 302b. For example, the classifier can be a separate machine learning model that receives intermediate outputs from the iterator module 110 and determines the likelihood that, without further iterations, the output 116 will be satisfactory to a user if the intermediate output is fed to the subsequent module (e.g., intermediate module 112) as the final iterated output of the iterator module 110. The determination that the output 116 will be satisfactory to the user can, in turn, be based on various user-defined controls as described in greater detail in relation to FIG. 4 below. If an intermediate output from the iterator module 110 is determined to likely result in an output 116 that satisfies a user-defined control, then the iterator module 110 can be prevented from performing any further iterations. On the other hand, if the intermediate output from the iterator module 110 is determined to be unlikely to result in an output 116 that satisfies a user-defined control, then the iterator module 110 can be utilized to perform additional iterations.

In some implementations, similarity metrics 302c can be used to determine the number of iterations to be performed by the iterator module 110. For example, similarity metrics 302c can be calculated based on the intermediate outputs of the iterator module 110 to determine if each intermediate output is substantially similar to one or more previously generated intermediate outputs of the iterator module 110. If the similarity metrics 302c indicate that such similarity has been reached, then it can be inferred that further iterations are unlikely to result in additional changes to the intermediate outputs of the iterator module 110, and the iterator module 110 can be controlled to stop performing additional iterations and to pass the most recent intermediate output to the next module of the model 100 (e.g., intermediate module 112) as the final iterated output of the iterator module 110.

In some implementations, rather than directly comparing intermediate outputs of the iterator module 110 with previously generated intermediate outputs, the iteration control module 302 can predict, for each intermediate output, the likelihood that it will be substantially similar to an intermediate output generated after a certain number of additional iterations of the iterator module 110. If substantial similarity is predicted (e.g., a predicted similarity metric exceeding a threshold value), then the iterator module 110 can be prevented from performing additional iterations and can be controlled to pass the most recent intermediate output to the next module of the model 100 (e.g., intermediate module 112) as the final iterated output of the iterator module 110.

In still other implementations, the iterator control module 302 of the machine learning model 300 can control the number of iterations performed by the iterator module 110 based on a size of the input sequence and/or a target sequence length of the output 116 generated by the final module. For example, a greater number of iterations may be desirable for longer input sequences 102 or output sequences 116 since more information transfer may be needed across these longer sequences.

Figure 4:
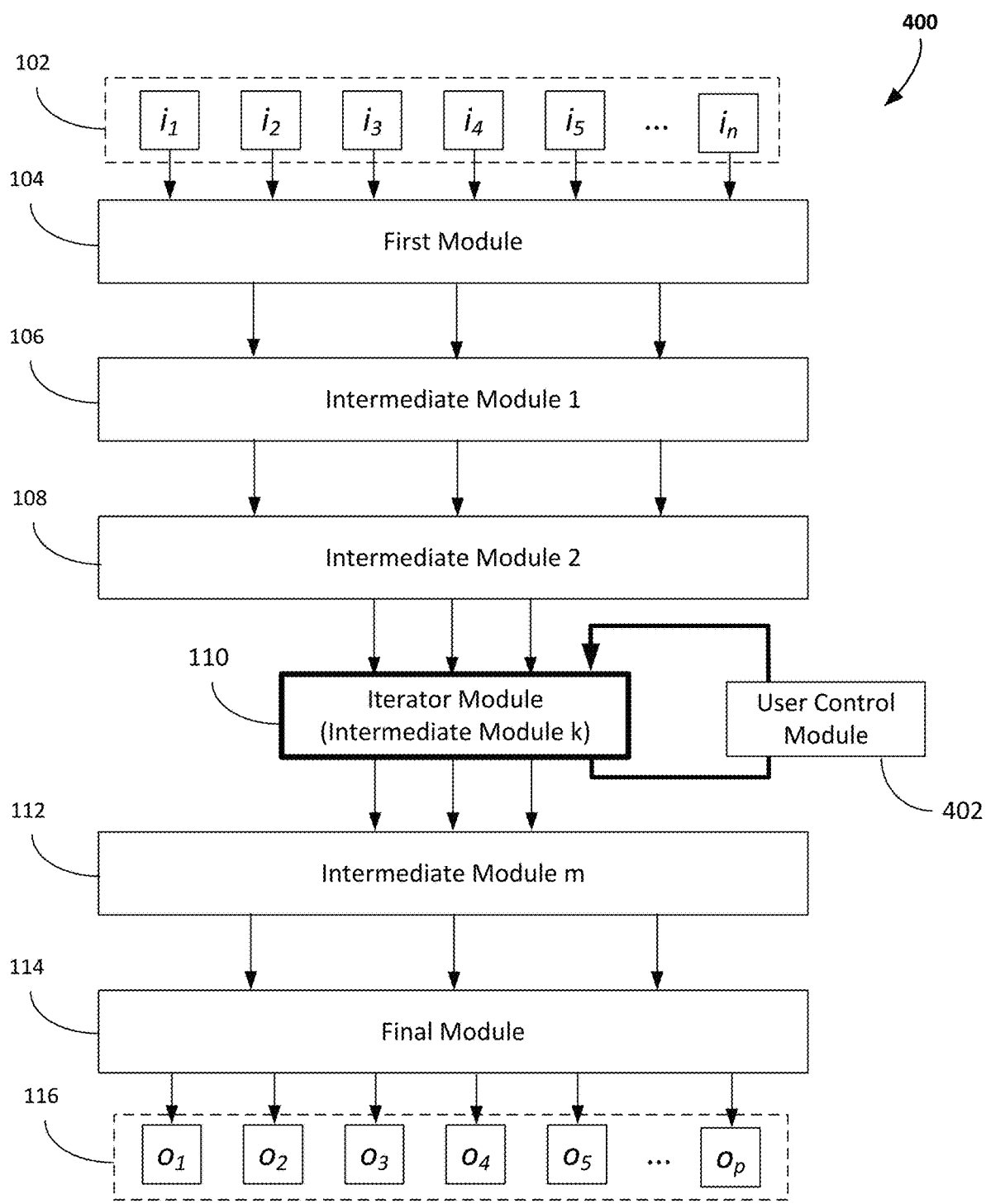
FIG. 4 is a diagram illustrating use of a classifier for providing user control of outputs generated by a machine learning model.

Referring now to FIG. 4, the architecture of a machine learning model 400 is shown that enables enhanced user control of the output 116. The machine learning model 400 has many similarities to the machine learning model 100 shown in FIG. 1, and consequently, like components have been labeled with like reference numerals. However, compared to the machine learning model 100, the machine learning model 400 additionally includes a user control module 402 that controls the number of iterations performed by the iterator module 110 in order to satisfy user-defined controls of the output 116. For example, the user control module can be implemented as a classifier (similar to the classifier 302*b*) that receives intermediate outputs from the iterator module 110 and determines the likelihood that, without further iterations, the output 116 will be satisfy a user-defined control if the intermediate output is fed to the subsequent module (e.g., intermediate module 112) as the final iterated output of the iterator module 110. Examples of such user-defined controls can include (but are not limited to) a target sequence length of the one or more outputs generated by the final module, a target semantic characteristic of the one or more outputs generated by the final module, a target metric of data structure cohesion of the one or more outputs generated by the final module, one or more form fields included among the one or more outputs generated by the final module, a target sentiment characteristic of the one or more outputs generated by the final module, an inclusion of specific tokens among the one or more outputs generated by the final module, and a target metric indicative of bias.

If an intermediate output from the iterator module 110 is determined to likely result in an output 116 that satisfies the user-defined control, then the iterator module 110 can be prevented from performing any further iterations. On the other hand, if the intermediate output from the iterator module 110 is determined to be unlikely to result in an output 116 that satisfies the user-defined control, then the iterator module 110 can be utilized to perform additional iterations. This can yield greater user control of the output 116 generated by a machine learning model 400 compared to existing non-iterative machine learning model architectures.

Figure 5:
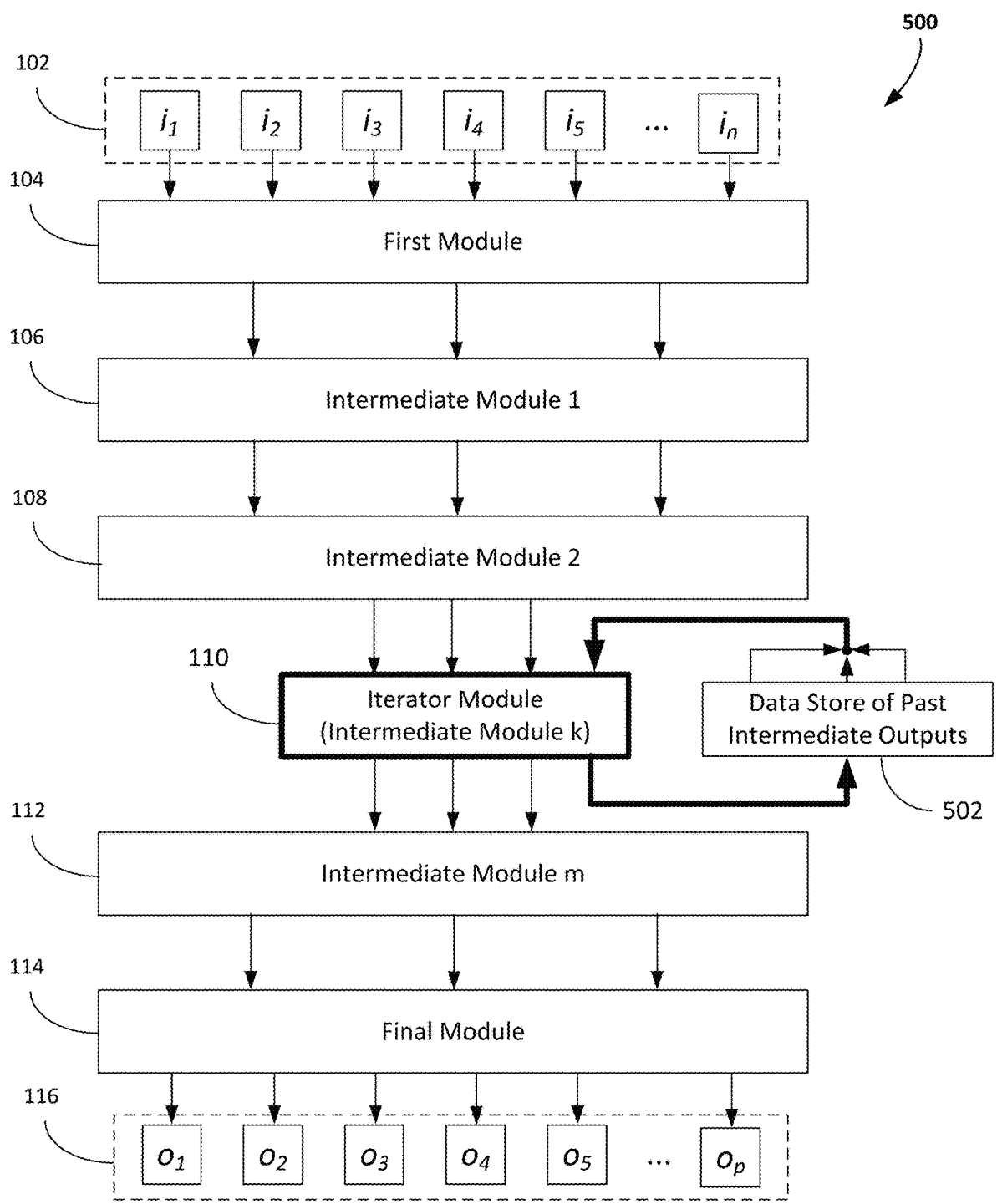
FIGS. 5-6 are diagrams illustrating techniques for implementing variable space usage with a machine learning model.

Referring now to FIG. 5, the architecture of a machine learning model 500 is shown that enables variable space usage. The machine learning model 500 has many similarities to the machine learning model 100 shown in FIG. 1, and consequently, like components have been labeled with like reference numerals. However, compared to the machine learning model 100, the machine learning model 500 additionally includes a data store of past intermediate outputs 502. As intermediate outputs are generated by the iterator module 110, one or more of these intermediate outputs can be retained in the data store 502. Consequently, rather than simply feeding back an intermediate output as the direct input to the iterator module 110 in the next iteration, the machine learning model 500 allows for one or more previously generated intermediate outputs to be combined with the most recent intermediate output to create a more informative input to the iterator module 110 at the next iteration. In some implementations, the size of the input fed to the iterator module and the number of previously generated intermediate outputs utilized can be varied based on the available computational resources and hardware constraints of a user's computing device or system.

Figure 6:
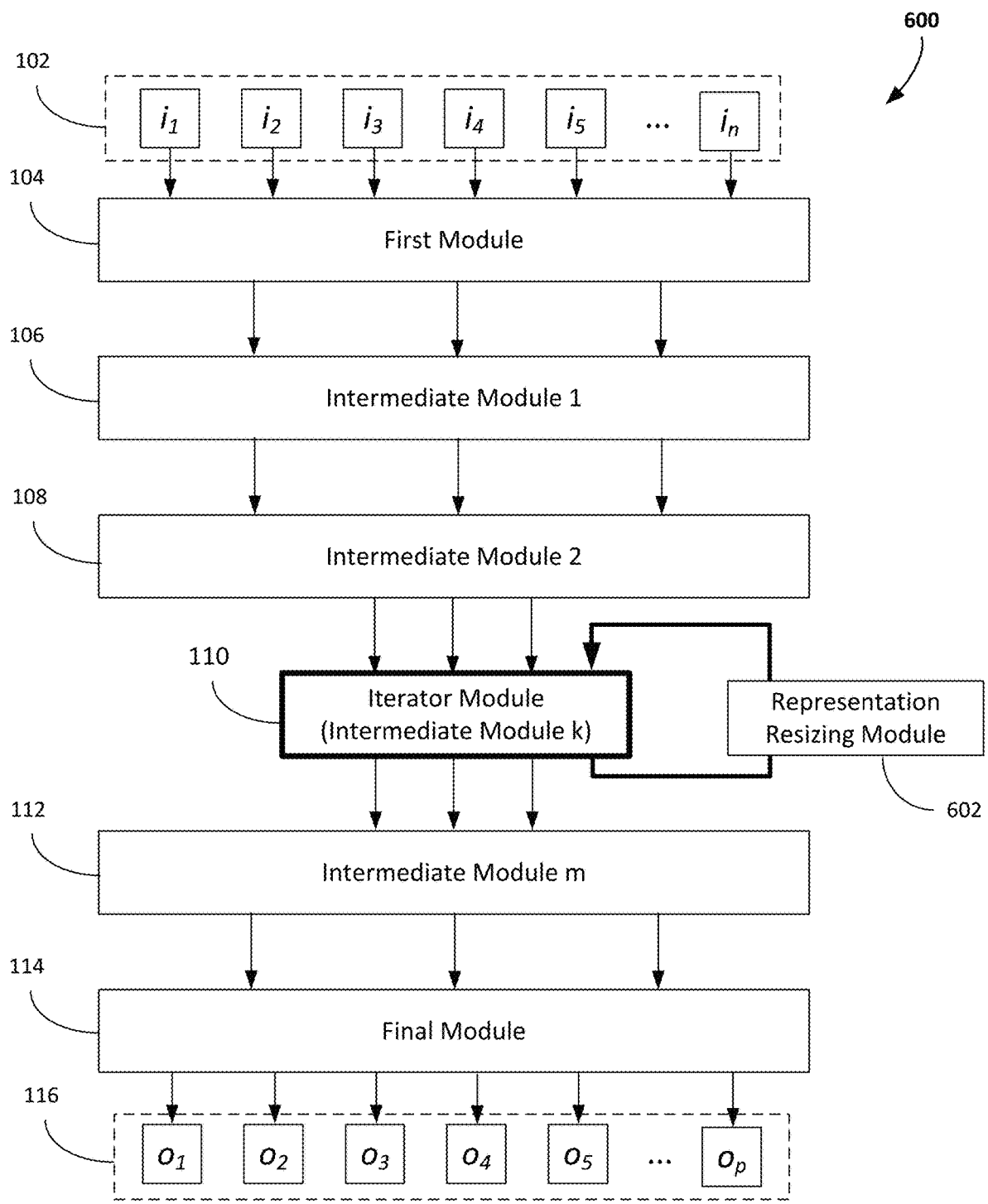

Referring now to FIG. 6, another architecture of a machine learning model 600 is shown that enables variable space usage. The machine learning model 600 has many similarities to the machine learning model 100 shown in FIG. 1, and consequently, like components have been labeled with like reference numerals. However, compared to the machine learning model 100, the machine learning model 600 additionally includes a representation resizing module 602. For example, the representation resizing module 602 can be an encoder or any other kind of module that changes the representation size of intermediate outputs generated by the iterator module 110 before feeding them back to the iterator module 110 as an input for the next iteration. In some implementations, the representation size can be increased in order to create a richer representation that is a more informative input to the iterator module 110 at the next iteration. The representation size can be varied based on the available computational resources and hardware constraints of a user's computing device or system.

Figure 7:
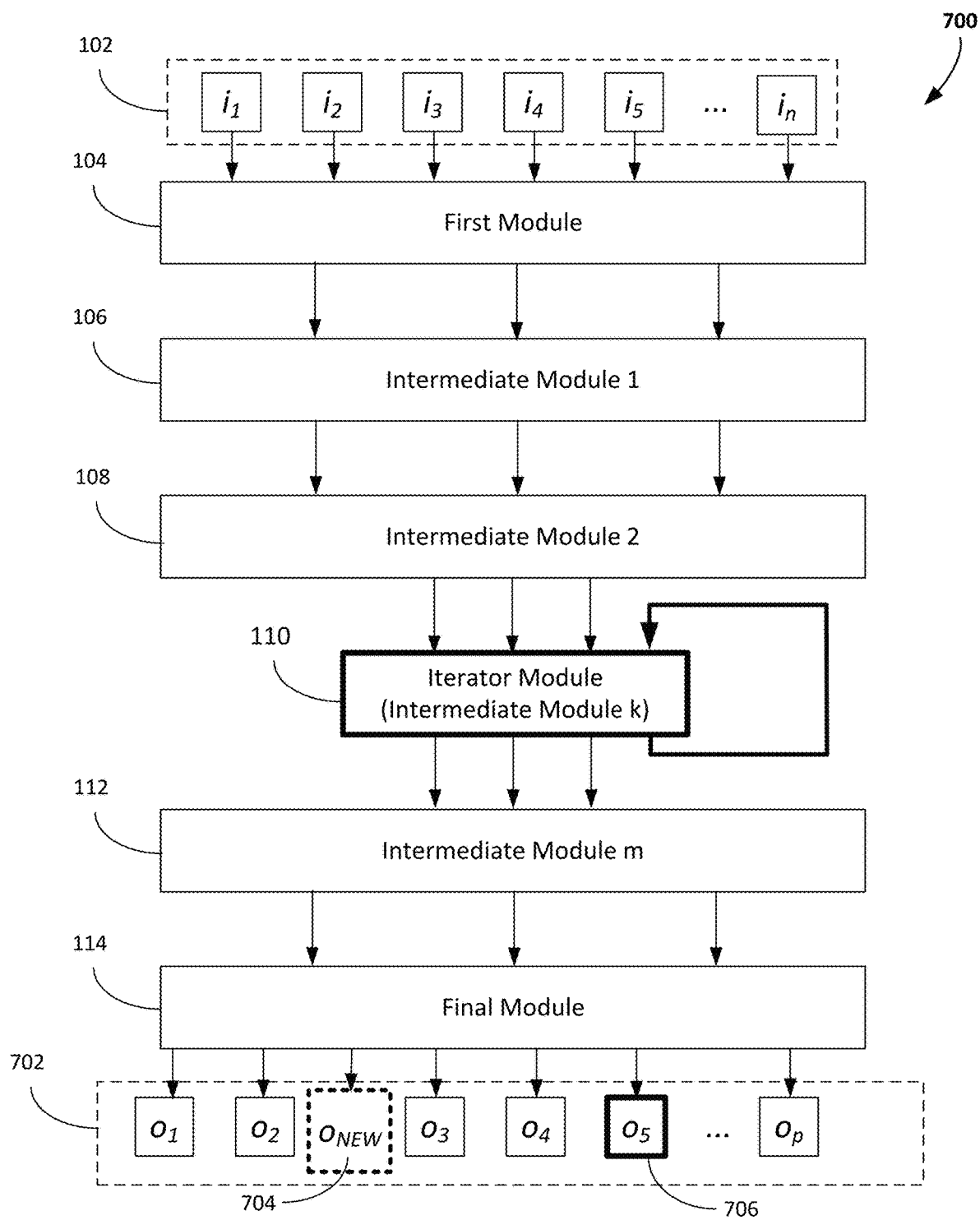
FIG. 7 is a diagram illustrating infilling applications of a machine learning model.

Referring now to FIG. 7, the architecture of a machine learning model 700 is shown that can be used for in-filling applications and for making other adjustments to the outputs generated by the machine learning model 700. The machine learning model 700 has many similarities to the machine learning model 100 shown in FIG. 1, and consequently, like components have been labeled with like reference numerals. However, compared to the machine learning model 100, the machine learning model 700 is illustrated to demonstrate its ability to generate modified outputs 702 relative to the output 116 shown in FIG. 1. After an initial run of the machine learning model 700, an initial output of the model 700 may be similar to the output 116 shown in FIG. 1 (with tokens $o_1$ to $o_p$). However, in order to generate a modified output 702, some of the original output tokens $o_1$ to $o_p$ can be fixed (e.g., $o_1$, $o_2$, $o_3$, $o_4$, $o_p$) while other output tokens are identified as "noisy" (e.g., token 706 (05)) and allowed to be altered, e.g., via a de-noising process performed by the machine learning model 700. In addition to identifying output tokens for de-noising, placeholder (or "epsilon") tokens can be inserted between the fixed output tokens (e.g., $o_1$, $o_2$, $o_3$, $o_4$, $o_p$) to allow for in-filling. Through this process additional output tokens can be inserted into the modified output 702 such as token 704 ($o_{NEW}$) and can also be de-noised by the machine learning model 700. In this way, the machine learning model 700 can be utilized to generate partially modified outputs 702 with reduced computational cost relative to generating a new output sequence entirely from scratch.

Figure 8:
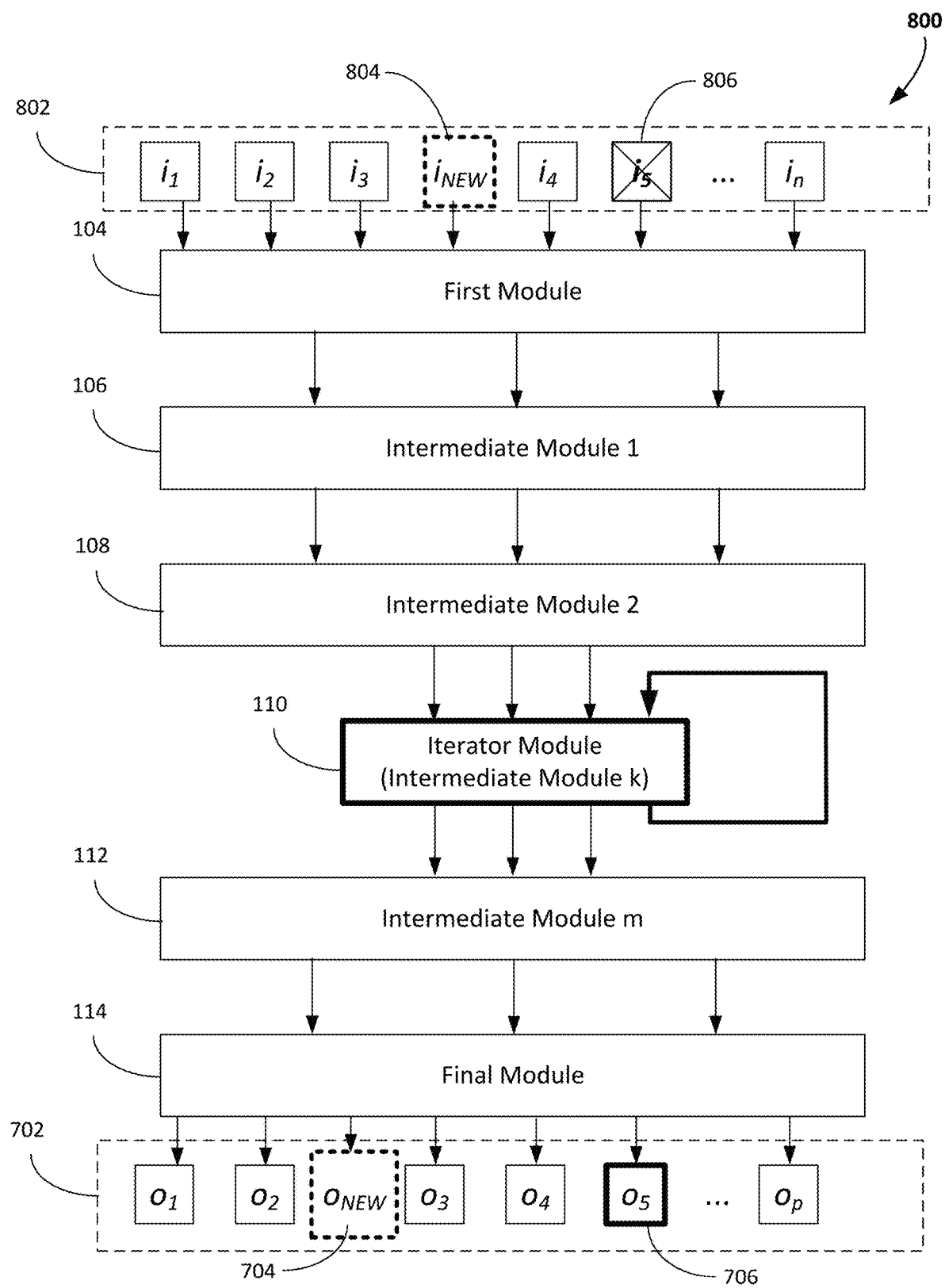
FIG. 8 is a diagram illustrating the receipt of a modified input sequence by a machine learning model.

In general, the partial fixing of sequence elements and insertion of epsilon tokens does not necessarily have to occur on the output of the final module 114, but can be equally applicable to the outputs of any other module of the machine learning model 700 (e.g., modules 104, 106, 108, 110, 112). Furthermore, as shown in FIG. 8, in some implementations, the modification of sequence tokens (including the addition of non-placeholder tokens and the deletion of existing tokens) can be initiated on the input sequence to the model 800 itself. The machine learning model 800 has many similarities to the machine learning model 700 shown in FIG. 7, and consequently, like components have been labeled with like reference numerals. However, compared to the machine learning model 700, the machine learning model 800 is illustrated to demonstrate the ability to generate a modified output 702 by modifying the input 802 with an additional token 804 ($i_{NEW}$) and a deleted token 806 ($i_5$) while fixing the other portions of the input 802 (e.g., $i_1$, $i_2$, $i_3$, $i_4$). As the modified input 802 is passed through the machine learning model 800 to generate the modified output 702, only a portion of the inputs (e.g., the non-fixed tokens) are processed by the various modules 104, 106, 108, 110, 112, 114. In this manner, the modified output 702 can be generated with lower computational cost than if the user were to run the model 800 with the modified input 802 from scratch. These savings in computation can be particularly advantageous in enabling applications where a user may, for example, initially submit a prompt to a large language model and then seek to edit their prompt to receive a modified response.

The ability to partially fix output sequences generated by various modules of a machine learning model can also have the advantage of improving model explainability. For example, it allows a user to perform a sensitivity analysis in which they can observe how specific changes to the sequences at various points in the machine learning model's processing (while keeping other portions of the sequences fixed) alters the outputs ultimately generated by the machine learning model. In some cases, a user can modify their input sequences (e.g., prompts) to the machine learning model and then compare the one or more outputs generated by the final module 114 to determine an explanation for the behavior of the model. The user can also compare the set of activations of the machine learning model across the various modules of the model (e.g., modules 104, 106, 108, 110, 112, 114) to determine how those outputs were produced.

Figure 9:
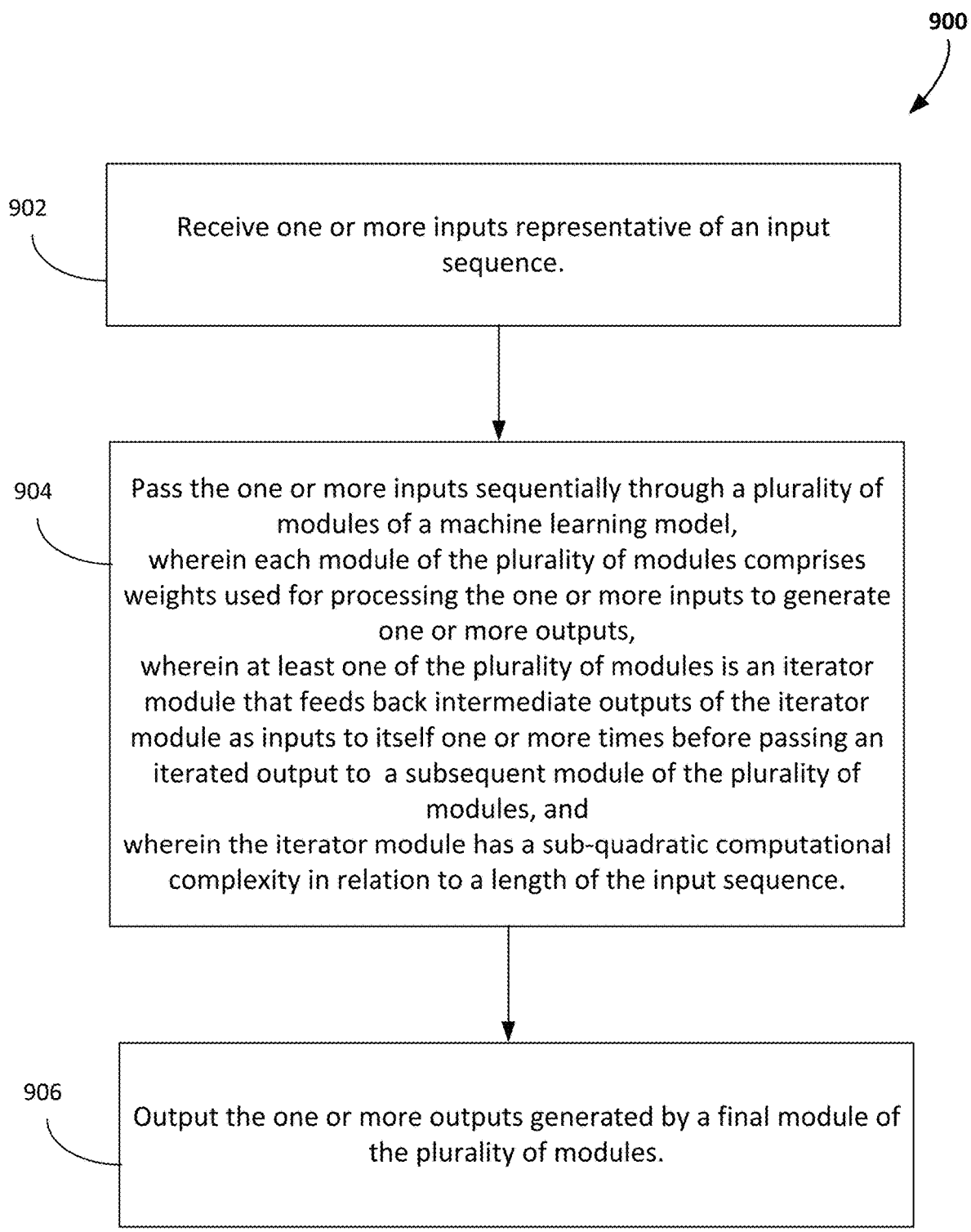
FIG. 9 is a flowchart showing a method of utilizing a machine learning model.

FIG. 9 illustrates an example process 900 for utilizing a machine learning model such as the machine learning models 100, 300, 400, 500, 600, 700, 800. These models can include a diffusion model, a flow model, a demasking model, an encoder-decoder transformer model, or a decoder transformer model. In some implementations, operations of the process 900 can be executed by a computing device or mobile computing device such as those described below in relation to FIG. 12.

Operations of the process 900 include receiving one or more inputs representative of an input sequence (902). For example, the one or more inputs can be tokens representative of the input sequences 102 and 802 described above.

Operations of the process 900 also include passing the one or more inputs sequentially through a plurality of modules of the machine learning model, wherein the plurality of modules each include weights used for processing the one or more inputs to generate one or more outputs, wherein at least one of the plurality of modules is an iterator module that feeds back intermediate outputs of the iterator module as inputs to itself one or more times before passing an iterated output to a subsequent module of the plurality of modules, and wherein the iterator module has a sub-quadratic computational complexity in relation to a length of the input sequence (904). For example, the plurality of modules can correspond to the modules 104, 106, 108, 110, 112, 114 described above, and the iterator module can correspond specifically to the iterator module 110. The iterator module can include one or more primitives that enable transfer of information from one portion of the input sequence to another portion of the input sequence (e.g., a sliding window attention primitive, a sparse attention primitive, a self-attention primitive, a state-space information moving primitive, or a non-pointwise information transfer primitive).

As described in relation to FIG. 3, the number of times that the iterator module feeds back the intermediate outputs as inputs to itself can be a predetermined number or can be based on a (i) a size of the input sequence or (ii) a target sequence length of the one or more outputs generated by the final module. Also described in relation to FIG. 3, passing the one or more inputs sequentially through the plurality of modules of the machine learning model can include determining whether each intermediate output of the iterator module satisfies a condition, and in response to determining that the condition is satisfied by a specific intermediate output, passing the specific intermediate output to the subsequent module of the plurality of modules as the iterated output. In some cases, as described in relation to FIG. 4, determining whether each intermediate output of the iterator module satisfies the condition can include utilizing a classifier to determine whether or not each intermediate output is likely to result in the one or more outputs generated by the final module satisfying a user-defined control.

As described in FIG. 5, the iterator module can feed back the intermediate outputs of the iterator module and one or more previously generated intermediate outputs of the iterator module as inputs to itself (e.g., via use of data store 502). And as described in FIG. 6, the iterator module can change a representation size of the intermediate outputs of the iterator module before feeding back the intermediate output as inputs to itself (e.g., via use of representation resizing module 602).

As described in FIGS. 7 and 8, an output sequence generated by at least one of the plurality of modules of the machine learning model can be partially fixed, and the operations of the process 900 can further include altering or adding to an unfixed portion of the output sequence (e.g., output sequence 702). The operations of the process 900 can also include updating a portion of the one or more inputs to include one or modified inputs (e.g., as shown by modified input sequence 802); passing the one or more modified inputs sequentially through a plurality of modules of the machine learning model, wherein only a portion of the one or more inputs corresponding to the one or more modified inputs are processed using the plurality of modules; and outputting one or more modified outputs (e.g., output sequence 702) generated by the final module of the plurality of modules. Operations of the process 900 can also include determining an explanation for a behavior of the machine learning model by comparing the one or more outputs generated by the final module with the one or more modified outputs generated by the final module, and comparing a first set of activations of the machine learning model used to produce the one or more outputs with a second set of activations of the machine learning model used to produce the one or more modified outputs Operations of the process 900 further include outputting the one or more outputs generated by a final module of the plurality of modules (906). For example, the final module can correspond to the final module 114 described above.

Figure 11:
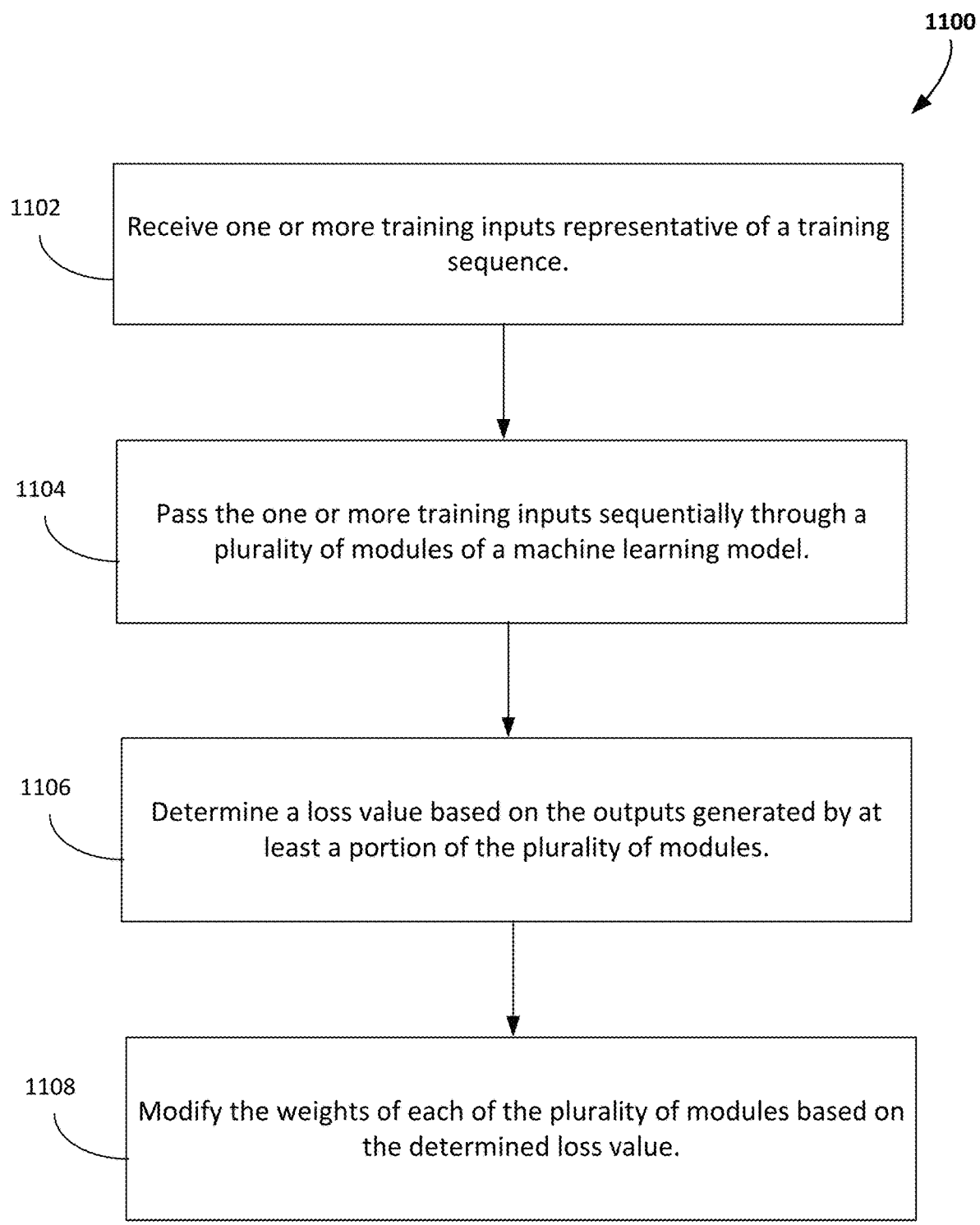
FIG. 11 is a flowchart showing a method of training a machine learning model.

FIG. 11 illustrates an example process 1100 for training a machine learning model such as the machine learning models 100, 300, 400, 500, 600, 700, 800. In some implementations, operations of the process 1100 can be executed by a computing device or mobile computing device such as those described below in relation to FIG. 12.

Figure 10:
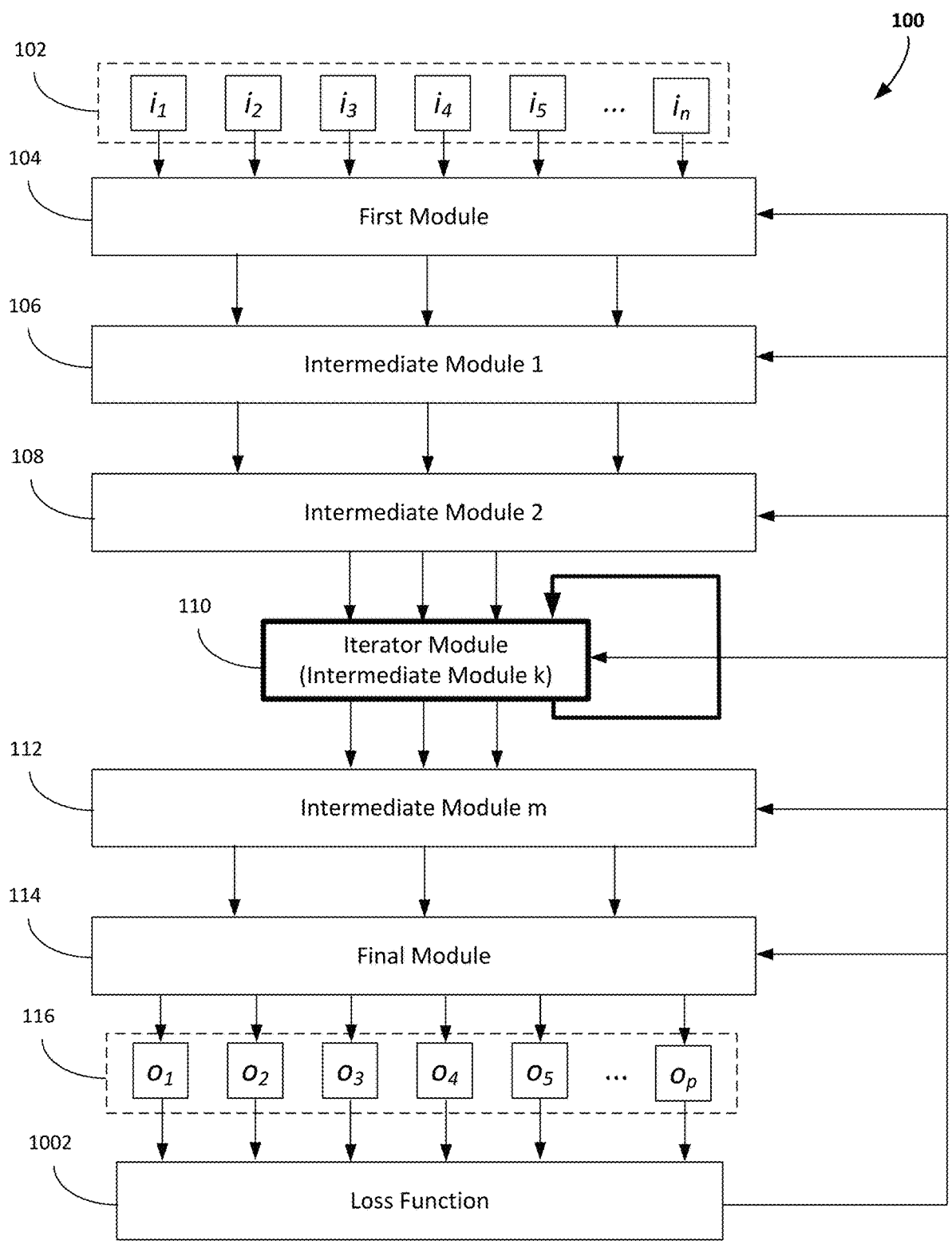
FIG. 10 is a diagram illustrating a technique for training a machine learning model.

Operations of the process 1100 include receiving one or more training inputs representative of a training sequence (1102). For example, the one or more training inputs can correspond to the input sequence 102 shown in the training process diagram depicted in FIG. 10. Operations of the process 1100 also include passing the one or more training inputs sequentially through the plurality of modules of the machine learning model (1104), and determining a loss value based on the outputs generated by at least a portion of the plurality of modules (1106). For example, determining the loss value can involve using the loss function 1002 shown in FIG. 10 to compare the actual outputs of the modules 104, 106, 108, 110, 112, 114 against target outputs for these modules based on a set of training examples. Operations of the process 1100 further include modifying the weights of each of the plurality of modules based on the determined loss value (1108), as shown in FIG. 10.

Figure 12:
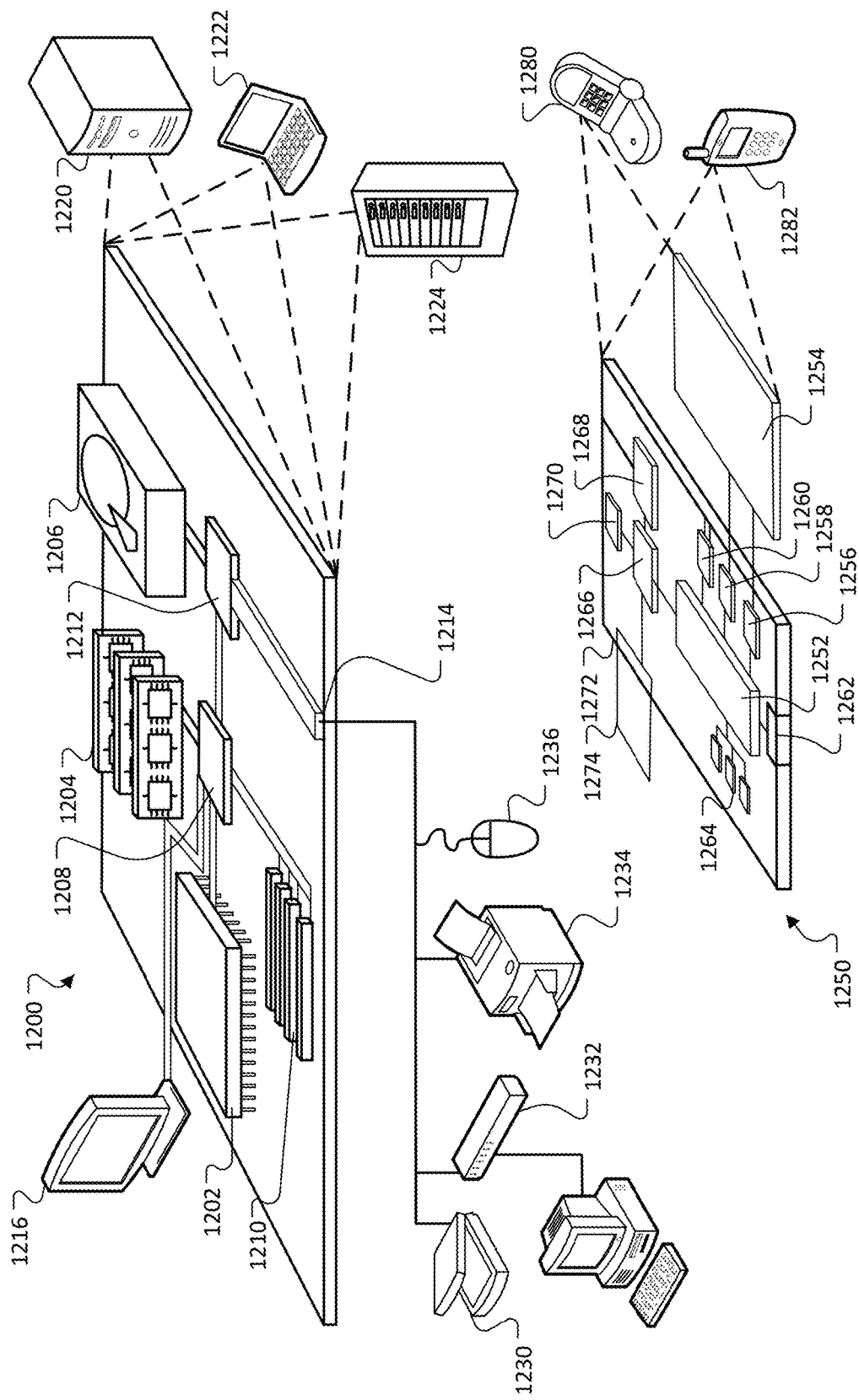
FIG. 12 is a diagram illustrating an example of a computing environment.

FIG. 12 shows an example of a computing device 1200 and a mobile computing device 1250 that are employed to execute implementations of the present disclosure. For example, the computing device 1200 and/or the mobile computing device (or multiple of such devices working in tandem) can be employed to execute various steps of the process 900 and the process 1100 as well as to execute software implementations of the machine learning models 100, 300, 400, 500, 600, 700, 800 described above. The computing device 1200 is intended to represent various forms of digital computers, such as laptops, desktops, workstations, personal digital assistants, servers, blade servers, mainframes, and other appropriate computers. The mobile computing device 1250 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 1200 includes a processor 1202, a memory 1204, a storage device 1206, a high-speed interface 1208, and a low-speed interface 1212. In some implementations, the high-speed interface 1208 connects to the memory 1204 and multiple high-speed expansion ports 1210. In some implementations, the low-speed interface 1212 connects to a low-speed expansion port 1214 and the storage device 1204. Each of the processor 1202, the memory 1204, the storage device 1206, the high-speed interface 1208, the high-speed expansion ports 1210, and the low-speed interface 1212, are interconnected using various buses, and may be mounted on a common motherboard or in other manners as appropriate. The processor 1202 can process instructions for execution within the computing device 1200, including instructions stored in the memory 1204 and/or on the storage device 1206 to display graphical information for a graphical user interface (GUI) on an external input/output device, such as a display 1216 coupled to the high-speed interface 1208. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 may also be another form of a computer-readable medium, such as a magnetic or optical disk.

The storage device 1206 is capable of providing mass storage for the computing device 1200. In some implementations, the storage device 1206 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 1202, perform one or more methods, such as those described above. The instructions can also be stored by one or more storage devices, such as computer-readable or machine-readable mediums, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is an example only. In some implementations, the high-speed interface 1208 is coupled to the memory 1204, the display 1216 (e.g., through a graphics processor or accelerator), and to the high-speed expansion ports 1210, which may accept various expansion cards. In the implementation, the low-speed interface 1212 is coupled to the storage device 1206 and the low-speed expansion port 1214. The low-speed expansion port 1214, which may include various communication ports (e.g., Universal Serial Bus (USB), Bluetooth, Ethernet, wireless Ethernet) may be coupled to one or more input/output devices. Such input/output devices may include a scanner 1230, a printing device 1234, or a keyboard or mouse 1236. The input/output devices may also be coupled to the low-speed expansion port 1214 through a network adapter 1232. Such network input/output devices may include, for example, a switch or router.

The computing device 1200 may be implemented in a number of different forms, as shown in FIG. 12. For example, it may be implemented as a standard server 1220, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device, such as a mobile computing device 1250. Each of such devices may contain one or more of the computing device 1200 and the mobile computing device 1250, and an entire system may be made up of multiple computing devices communicating with each other.

The mobile computing device 1250 includes a processor 1252; a memory 1264; an input/output device, such as a display 1254; a communication interface 1266; and a transceiver 1268; among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate. In some implementations, the mobile computing device 1250 may include a camera device(s).

The processor 1252 can execute instructions within the mobile computing device 1250, including instructions stored in the memory 1264. The processor 1252 may be implemented as a chipset of chips that include separate and multiple analog and digital processors. For example, the processor 1252 may be a Complex Instruction Set Computers (CISC) processor, a Reduced Instruction Set Computer (RISC) processor, or a Minimal Instruction Set Computer (MISC) processor. The processor 1252 may provide, for example, for coordination of the other components of the mobile computing device 1250, such as control of user interfaces (UIs), applications run by the mobile computing device 1250, and/or wireless communication by the mobile computing device 1250.

The processor 1252 may communicate with a user through a control interface 1258 and a display interface 1256 coupled to the display 1254. The display 1254 may be, for example, a Thin-Film-Transistor Liquid Crystal Display (TFT) display, an Organic Light Emitting Diode (OLED) display, or other appropriate display technology. The display interface 1256 may include appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a Single in Line Memory Module (SIMM) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provided as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 1252, perform one or more methods, such as those described above. The instructions can also be stored by one or more storage devices, such as one or more computer-readable or machine-readable mediums, such as the memory 1264, the expansion memory 1274, or memory on the processor 1252. In some implementations, the instructions can be received in a propagated signal, such as, over the transceiver 1268 or the external interface 1262.

The mobile computing device 1250 may communicate wirelessly through the communication interface 1266, which may include digital signal processing circuitry where necessary. The communication interface 1266 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 1268 using a radio frequency. In addition, short-range communication, such as using a Bluetooth or Wi-Fi, may occur. In addition, a Global Positioning System (GPS) receiver module 1270 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in FIG. 12. For example, it may be implemented a phone device 1280, a personal digital assistant 1282, and a tablet device (not shown). The mobile computing device 1250 may also be implemented as a component of a smart-phone, AR device, or other similar mobile device.

Computing device 1200 and/or 1250 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method of using an artificial neural network (ANN), the method comprising:
   receiving, at an input layer of the ANN, one or more inputs representative of an input sequence;
   passing the one or more inputs sequentially through a plurality of layers of the ANN,
      wherein each layer of the plurality of layers comprises weights used for processing the one or more inputs to generate one or more outputs,
      wherein at least one of the plurality of layers is an iterator layer that feeds back intermediate outputs of the iterator layer as inputs to itself one or more times before passing an iterated output to a subsequent layer of the plurality of layers, and
      wherein the iterator layer is configured to execute each iteration at a computational complexity that is subquadratic in relation to a length of the input sequence; and
   outputting the one or more outputs generated by a final layer of the plurality of layers, wherein passing the one or more inputs sequentially through the plurality of layers of the ANN comprises:
    determining whether each intermediate output of the iterator layer satisfies a condition, and
        in response to determining that the condition is satisfied by a specific intermediate output, passing the specific intermediate output to the subsequent layer of the plurality of layers as the iterated output, and
    wherein determining whether each intermediate output of the iterator layer satisfies the condition comprises determining whether a similarity metric computed based on the specific intermediate output and one or more previously generated intermediate outputs is within a threshold.

2. The method of claim 1, wherein the ANN comprises a diffusion model, a flow model, a demasking model, an encoder-decoder transformer model, or a decoder transformer model.

3. The method of claim 1, wherein the iterator layer comprises one or more primitives that enable transfer of information from one portion of the input sequence to another portion of the input sequence.

4. The method of claim 3, wherein the one or more primitives of the iterator layer comprise at least one of a sliding window attention primitive, a sparse attention primitive, a self-attention primitive, a state-space information moving primitive, or a non-pointwise information transfer primitive.

5. The method of claim 3, wherein the one or more primitives of the iterator layer are both forward-looking and backward-looking.

6. The method of claim 1, wherein a number of times that the iterator layer feeds back the intermediate outputs of the iterator layer as inputs to itself is a pre-determined number.

7. The method of claim 1, wherein a number of times that the iterator layer feeds back the intermediate outputs of the iterator layer as inputs to itself is based on at least one of (i) a size of the input sequence or (ii) a target sequence length of the one or more outputs generated by the final layer.

8. The method of claim 1, wherein the iterator layer feeds back the intermediate outputs of the iterator layer and one or more previously generated intermediate outputs of the iterator layer as inputs to itself.

9. The method of claim 1, wherein the iterator layer changes a representation size of the intermediate outputs of the iterator layer before feeding back the intermediate output as inputs to itself.

10. The method of claim 1, wherein an output sequence generated by at least one of the plurality of layers of the ANN is partially fixed, and wherein the method comprises altering or adding to an unfixed portion of the output sequence.

11. The method of claim 1, wherein the one or more outputs generated by the final layer of the plurality of layers can be partially fixed, and wherein the method comprises altering or adding to the unfixed portions of the one or more outputs generated by the final layer without reprocessing all of the one or more inputs using the plurality of layers.

12. The method of claim 1, wherein the ANN is trained by:
    receiving one or more training inputs representative of a training sequence;
    passing the one or more training inputs sequentially through the plurality of layers of the ANN;
    determining a loss value based on the outputs generated by at least a portion of the plurality of layers; and
    modifying the weights of each of the plurality of layers based on the determined loss value.

13. A method of using an artificial neural network (ANN), the method comprising:
    receiving, at an input layer of the ANN, one or more inputs representative of an input sequence;
    passing the one or more inputs sequentially through a plurality of layers of the ANN,
        wherein each layer of the plurality of layers comprises weights used for processing the one or more inputs to generate one or more outputs,
        wherein at least one of the plurality of layers is an iterator layer that feeds back intermediate outputs of the iterator layer as inputs to itself one or more times before passing an iterated output to a subsequent layer of the plurality of layers, and
        wherein the iterator layer is configured to execute each iteration at a computational complexity that is subquadratic in relation to a length of the input sequence; and
    outputting the one or more outputs generated by a final layer of the plurality of layers,
    wherein passing the one or more inputs sequentially through the plurality of layers of the ANN comprises:
        determining whether each intermediate output of the iterator layer satisfies a condition, and
            in response to determining that the condition is satisfied by a specific intermediate output, passing the specific intermediate output to the subsequent layer of the plurality of layers as the iterated output, and
        wherein determining whether each intermediate output of the iterator layer satisfies the condition comprises utilizing metrics to determine whether or not each intermediate output is likely to have one or more similarities to an intermediate output generated after a number of additional iterations of the iterator layer.

14. A method of using an artificial neural network (ANN), the method comprising:
    receiving, at an input layer of the ANN, one or more inputs representative of an input sequence;
    passing the one or more inputs sequentially through a plurality of layers of the ANN,
        wherein each layer of the plurality of layers comprises weights used for processing the one or more inputs to generate one or more outputs,
        wherein at least one of the plurality of layers is an iterator layer that feeds back intermediate outputs of the iterator layer as inputs to itself one or more times before passing an iterated output to a subsequent layer of the plurality of layers, and
        wherein the iterator layer is configured to execute each iteration at a computational complexity that is subquadratic in relation to a length of the input sequence; and
    outputting the one or more outputs generated by a final layer of the plurality of layers,
    wherein passing the one or more inputs sequentially through the plurality of layers of the ANN comprises:
        determining whether each intermediate output of the iterator layer satisfies a condition, and
            in response to determining that the condition is satisfied by a specific intermediate output, passing the specific intermediate output to the subsequent layer of the plurality of layers as the iterated output, and
        wherein determining whether each intermediate output of the iterator layer satisfies the condition comprises utilizing a classifier to determine whether or not each intermediate output is likely to result in the one or more outputs generated by the final layer satisfying a user-defined control.

15. The method of claim 14, wherein the user-defined control comprises a target sequence length of the one or more outputs generated by the final layer, a target semantic characteristic of the one or more outputs generated by the final layer, a target metric of data structure cohesion of the one or more outputs generated by the final layer, one or more form fields included among the one or more outputs generated by the final layer, a target sentiment characteristic of the one or more outputs generated by the final layer, an inclusion of specific tokens among the one or more outputs generated by the final layer, or a target metric indicative of bias.

16. A method of using an artificial neural network (ANN), the method comprising:
    receiving, at an input layer of the ANN, one or more inputs representative of an input sequence;
    passing the one or more inputs sequentially through a plurality of layers of the ANN,
        wherein each layer of the plurality of layers comprises weights used for processing the one or more inputs to generate one or more outputs,
        wherein at least one of the plurality of layers is an iterator layer that feeds back intermediate outputs of the iterator layer as inputs to itself one or more times before passing an iterated output to a subsequent layer of the plurality of layers, and
        wherein the iterator layer is configured to execute each iteration at a computational complexity that is sub-quadratic in relation to a length of the input sequence;
    outputting the one or more outputs generated by a final layer of the plurality of layers;
    updating a portion of the one or more inputs to include one or modified inputs;
    passing the one or more modified inputs sequentially through a plurality of layers of the ANN, wherein only a portion of the one or more inputs corresponding to the one or more modified inputs are processed using the plurality of layers; and
    outputting one or more modified outputs generated by the final layer of the plurality of layers.

17. The method of claim 16, further comprising determining an explanation for a behavior of the ANN, wherein determining the explanation comprises:
    comparing the one or more outputs generated by the final layer with the one or more modified outputs generated by the final layer; and
    comparing a first set of activations of the ANN used to produce the one or more outputs with a second set of activations of the ANN used to produce the one or more modified outputs.

18. An artificial neural network (ANN) encoded on one or more non-transitory machine-readable storage media, the ANN configured to:
    receive, at an input layer of the ANN, one or more inputs representative of an input sequence;
    pass the one or more inputs sequentially through a plurality of layers of the ANN;
        wherein each layer of the plurality of layers comprises weights used for processing the one or more inputs to generate one or more outputs,
        wherein at least one of the plurality of layers is an iterator layer that feeds back intermediate outputs of the iterator layer as inputs to itself one or more times before passing an iterated output to a subsequent layer of the plurality of layers, and
        wherein the iterator layer is configured to execute each iteration at a computational complexity that is sub-quadratic in relation to a length of the input sequence; and
    output the one or more outputs generated by a final layer of the plurality of layers,
        wherein passing the one or more inputs sequentially through the plurality of layers of the ANN comprises:
            determining whether each intermediate output of the iterator layer satisfies a condition, and
            in response to determining that the condition is satisfied by a specific intermediate output, passing the specific intermediate output to the subsequent layer of the plurality of layers as the iterated output, and
        wherein determining whether each intermediate output of the iterator layer satisfies the condition comprises determining whether a similarity metric computed based on the specific intermediate output and one or more previously generated intermediate outputs is within a threshold.

19. An artificial neural network (ANN) encoded on one or more non-transitory machine-readable storage media, the ANN configured to:
    receive, at an input layer of the ANN, one or more inputs representative of an input sequence;
    pass the one or more inputs sequentially through a plurality of layers of the ANN;
        wherein each layer of the plurality of layers comprises weights used for processing the one or more inputs to generate one or more outputs,
        wherein at least one of the plurality of layers is an iterator layer that feeds back intermediate outputs of the iterator layer as inputs to itself one or more times before passing an iterated output to a subsequent layer of the plurality of layers, and
        wherein the iterator layer is configured to execute each iteration at a computational complexity that is sub-quadratic in relation to a length of the input sequence; and
    output the one or more outputs generated by a final layer of the plurality of layers,
        wherein passing the one or more inputs sequentially through the plurality of layers of the ANN comprises:
            determining whether each intermediate output of the iterator layer satisfies a condition, and
            in response to determining that the condition is satisfied by a specific intermediate output, passing the specific intermediate output to the subsequent layer of the plurality of layers as the iterated output, and
        wherein determining whether each intermediate output of the iterator layer satisfies the condition comprises utilizing metrics to determine whether or not each intermediate output is likely to have one or more similarities to an intermediate output generated after a number of additional iterations of the iterator layer.

20. An artificial neural network (ANN) encoded on one or more non-transitory machine-readable storage media, the ANN configured to:
    receive, at an input layer of the ANN, one or more inputs representative of an input sequence;

pass the one or more inputs sequentially through a plurality of layers of the ANN;
  wherein each layer of the plurality of layers comprises weights used for processing the one or more inputs to generate one or more outputs,
  wherein at least one of the plurality of layers is an iterator layer that feeds back intermediate outputs of the iterator layer as inputs to itself one or more times before passing an iterated output to a subsequent layer of the plurality of layers, and
  wherein the iterator layer is configured to execute each iteration at a computational complexity that is subquadratic in relation to a length of the input sequence; and
output the one or more outputs generated by a final layer of the plurality of layers,
  wherein passing the one or more inputs sequentially through the plurality of layers of the ANN comprises:
    determining whether each intermediate output of the iterator layer satisfies a condition, and
    in response to determining that the condition is satisfied by a specific intermediate output, passing the specific intermediate output to the subsequent layer of the plurality of layers as the iterated output, and
  wherein determining whether each intermediate output of the iterator layer satisfies the condition comprises utilizing a classifier to determine whether or not each intermediate output is likely to result in the one or more outputs generated by the final wherein determining whether each intermediate output of the iterator layer satisfies the condition comprises utilizing a classifier to determine whether or not each intermediate output is likely to result in the one or more outputs generated by the final layer satisfying a user-defined control.

21. An artificial neural network (ANN) encoded on one or more non-transitory machine-readable storage media, the ANN configured to:
  receive, at an input layer of the ANN, one or more inputs representative of an input sequence;
  pass the one or more inputs sequentially through a plurality of layers of the ANN;
    wherein each layer of the plurality of layers comprises weights used for processing the one or more inputs to generate one or more outputs,
    wherein at least one of the plurality of layers is an iterator layer that feeds back intermediate outputs of the iterator layer as inputs to itself one or more times before passing an iterated output to a subsequent layer of the plurality of layers, and
    wherein the iterator layer is configured to execute each iteration at a computational complexity that is subquadratic in relation to a length of the input sequence; and
  output the one or more outputs generated by a final layer of the plurality of layers;
  update a portion of the one or more inputs to include one or modified inputs;
  pass the one or more modified inputs sequentially through a plurality of layers of the ANN, wherein only a portion of the one or more inputs corresponding to the one or more modified inputs are processed using the plurality of layers; and
  output one or more modified outputs generated by the final layer of the plurality of layers.

* * * * *